(12) United States Patent
Choi et al.

(10) Patent No.: US 12,505,901 B2
(45) Date of Patent: Dec. 23, 2025

(54) MULTI-INSTANCE GPU-BASED SYSTEM FOR DISCOVERING DRUG CANDIDATE

(71) Applicant: CALICI CO., LTD., Daejeon (KR)

(72) Inventors: Jae Mun Choi, Daejeon (KR); Young Bin Park, Seoul (KR); Chul Sung, White Plains, NY (US); Van Huong Le, Daejeon (KR); Trong Tue Tran, Daejeon (KR); Yu Kyung Yun, Daejeon (KR); Jin Hee Park, Daejeon (KR); Jonathan Willianto, White Plains, NY (US); Nuzup Shadiev, Seoul (KR)

(73) Assignee: CALICI CO., LTD., Daejeon (KR)

( * ) Notice: Subject to any disclaimer, the term of this patent is extended or adjusted under 35 U.S.C. 154(b) by 0 days.

(21) Appl. No.: 18/878,959

(22) PCT Filed: Dec. 21, 2023

(86) PCT No.: PCT/KR2023/021355
§ 371 (c)(1),
(2) Date: Dec. 26, 2024

(87) PCT Pub. No.: WO2025/023400
PCT Pub. Date: Jan. 30, 2025

(65) Prior Publication Data
US 2025/0166740 A1    May 22, 2025

(30) Foreign Application Priority Data

Jul. 26, 2023  (KR) .................. 10-2023-0097539
Dec. 18, 2023  (KR) .................. 10-2023-0184594

(51) Int. Cl.
*G16B 15/30*       (2019.01)
*G06F 3/0482*      (2013.01)
(Continued)

(52) U.S. Cl.
CPC ........... *G16B 15/30* (2019.02); *G06F 3/0482* (2013.01); *G06F 3/0486* (2013.01);
(Continued)

(58) Field of Classification Search
CPC ......... G16B 15/30; G16B 5/00; G06F 3/0482; G06F 3/0486; G06F 9/5011; G16C 20/50; G16C 20/80
See application file for complete search history.

(56) References Cited

U.S. PATENT DOCUMENTS 11,049,590 B1    6/2021  Lee et al.

FOREIGN PATENT DOCUMENTS

| CN | 110352459 A | 10/2019 |
| CN | 112216348 A | 1/2021 |
| KR | 10-2496208 B1 | 2/2023 |

OTHER PUBLICATIONS

Nowotka, Michał M., et al. "Using ChEMBL web services for building applications and data processing workflows relevant to drug discovery." Expert opinion on drug discovery 12.8 (2017): 757-767. (Year: 2017).*

(Continued)

*Primary Examiner* — Karlheinz R. Skowronek
*Assistant Examiner* — Mary C Leverett
(74) *Attorney, Agent, or Firm* — Sughrue Mion, PLLC

(57) ABSTRACT

A drug candidate discovery system may include: a project management module configured to create a project for adding a task to perform drug candidate discovery; a simulation management module configured to create a simulation on the created project; a simulation setting module configured to set a simulation workflow for the simulation based on input from a user, using a canvas area and a simulation setting area containing a protein structure data input area and a task module selection area, each containing one or more (Continued)

objects that can be dragged and dropped onto the canvas area and converted into a node; a simulation workflow management module configured to manage information on nodes that can precede or follow in the simulation workflow; and a simulation execution module configured to manage and execute a task for running the simulation workflow by dividing and allocating GPU resource to the respective nodes.

18 Claims, 23 Drawing Sheets

(51) Int. Cl.
    *G06F 3/0486*    (2013.01)
    *G06F 9/50*      (2006.01)
    *G16B 5/00*      (2019.01)
    *G16C 20/50*     (2019.01)
    *G16C 20/80*     (2019.01)

(52) U.S. Cl.
    CPC .............. *G06F 9/5011* (2013.01); *G16B 5/00* (2019.02); *G16C 20/50* (2019.02); *G16C 20/80* (2019.02)

(56) References Cited

OTHER PUBLICATIONS

Brown, David K., et al. "JMS: an open source workflow management system and web-based cluster front-end for high performance computing." PLoS One 10.8 (2015): e0134273. (Year: 2015).*

Achilleos, "Open Source Workflow Systems for the Development of Complex Computational Experiments", A Thesis Submitted in Partial Fulfillment of the Requirements for the Degree of Master of Science at the University of Cyprus, Jun. 2012, 120 pages total.

Gorgulla et al., "VirtualFlow 2.0—The Next Generation Drug Discovery Platform Enabling Adaptive Screens of 69 Billion Molecules", bioRxiv, Apr. 26, 2023, pp. 1-32.

Gasulla, "Improving Performance and Energy Efficiency of Heterogeneous Systems with rCUDA", A thesis submitted in partial fulfillment of the requirements for the degree of Doctor of Philosophy (Computer Engineering), Universitat Politecnica de Valencia, Jan. 2021, 235 pages total.

Atienza et al., "In silico evaluation of the inhibitory property of *Holothuria scabra* (sea cucumber) with the catalytic domain of matrix metalloproteinase-1 for collagen degradation via interaction of triterpenoid saponins", Journal of Pharmacognosy and Phytochemistry, 2022, vol. 11, No. 2, pp. 247-257.

Buyya et al., "The Virtual Laboratory: a toolset to enable distributed molecular modelling for drug design on the World-Wide Grid", Concurrency Computat.: Pract. Exper., 2003, vol. 15, pp. 1-25.

Kirchmair et al., "The Protein Data Bank (PDB), Its Related Services and Software Tools as Key Components for In Silico Guided Drug Discovery", Journal of Medicinal Chemistry, Nov. 27, 2008, vol. 51, No. 22, pp. 7021-7040.

Office Action issued Mar. 11, 2024 in Korean Application No. 10-2023-0184594.

Xing, et al., "Extracting Disease-Gene-Drug Correlations Based on Data Cube", Data Analysis and Knowledge Discovery, Oct. 2017, pp. 94-104 (11 pages).

* cited by examiner

[Figure 1]
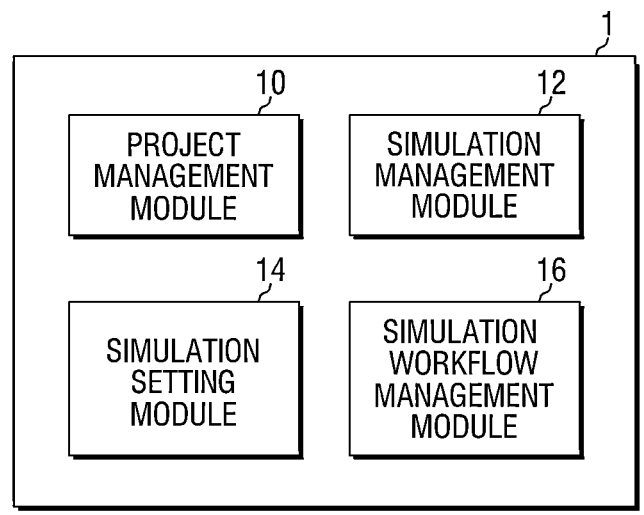

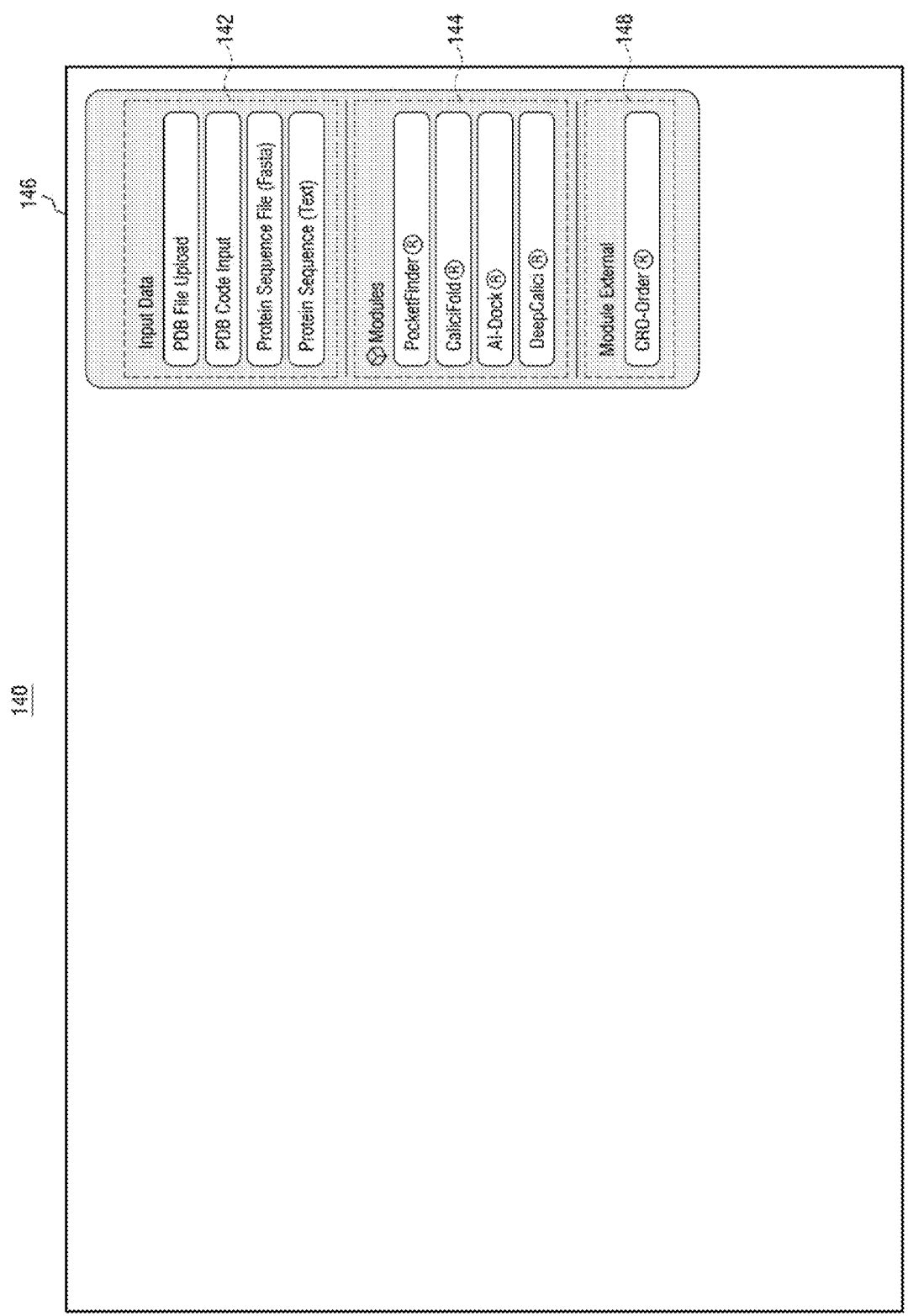
[Figure 2]

[Figure 3]
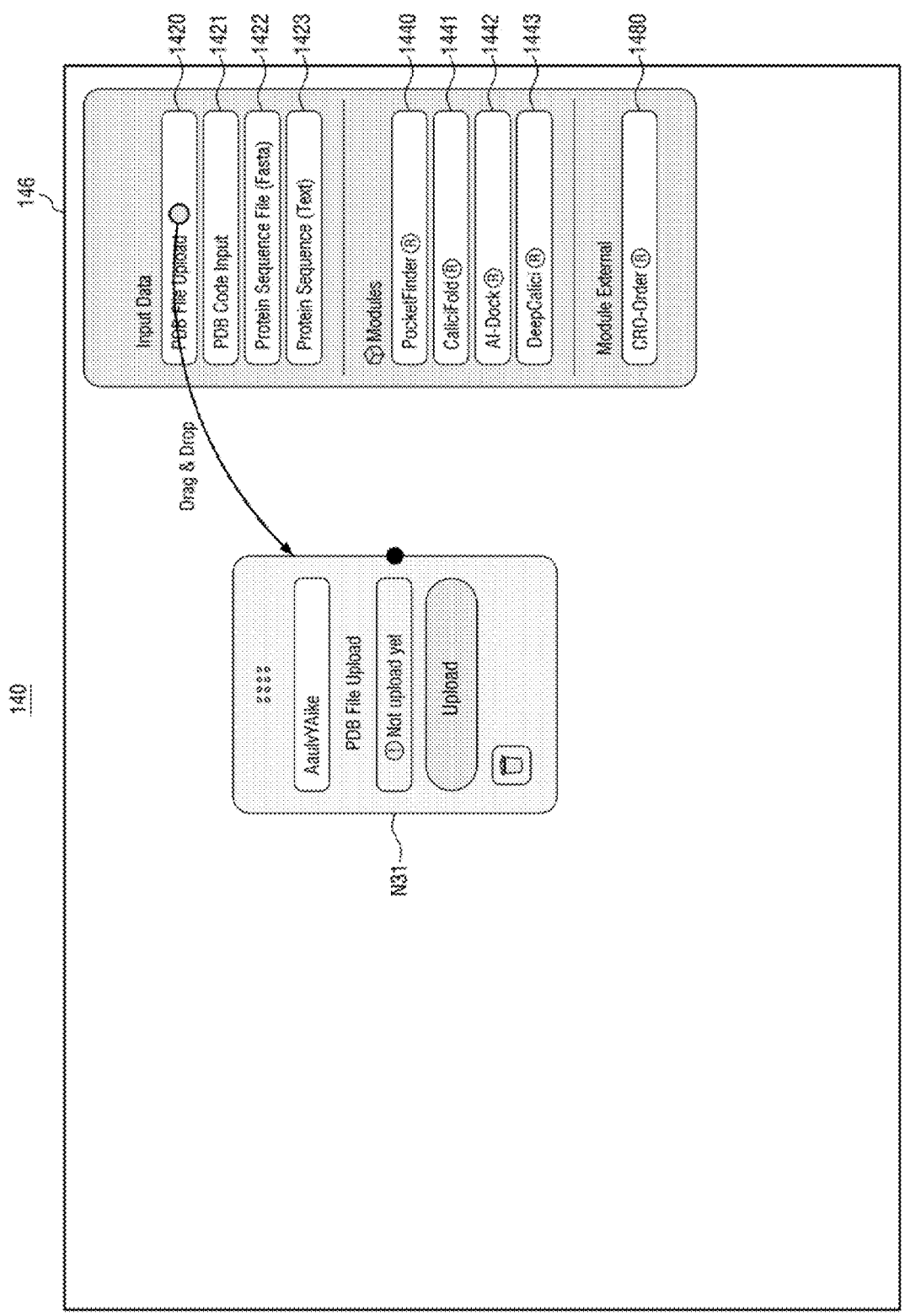

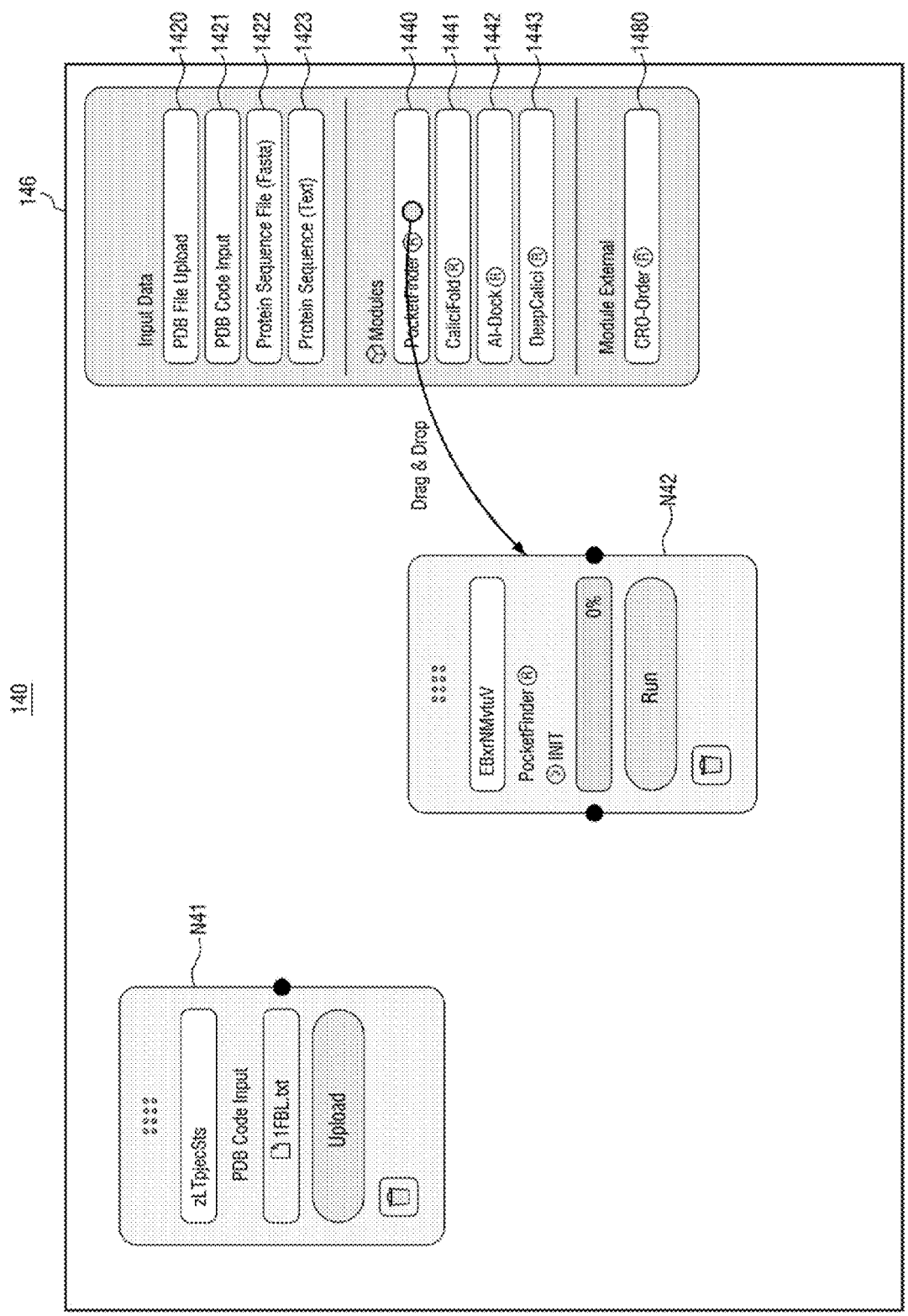
[Figure 4]

[Figure 5]
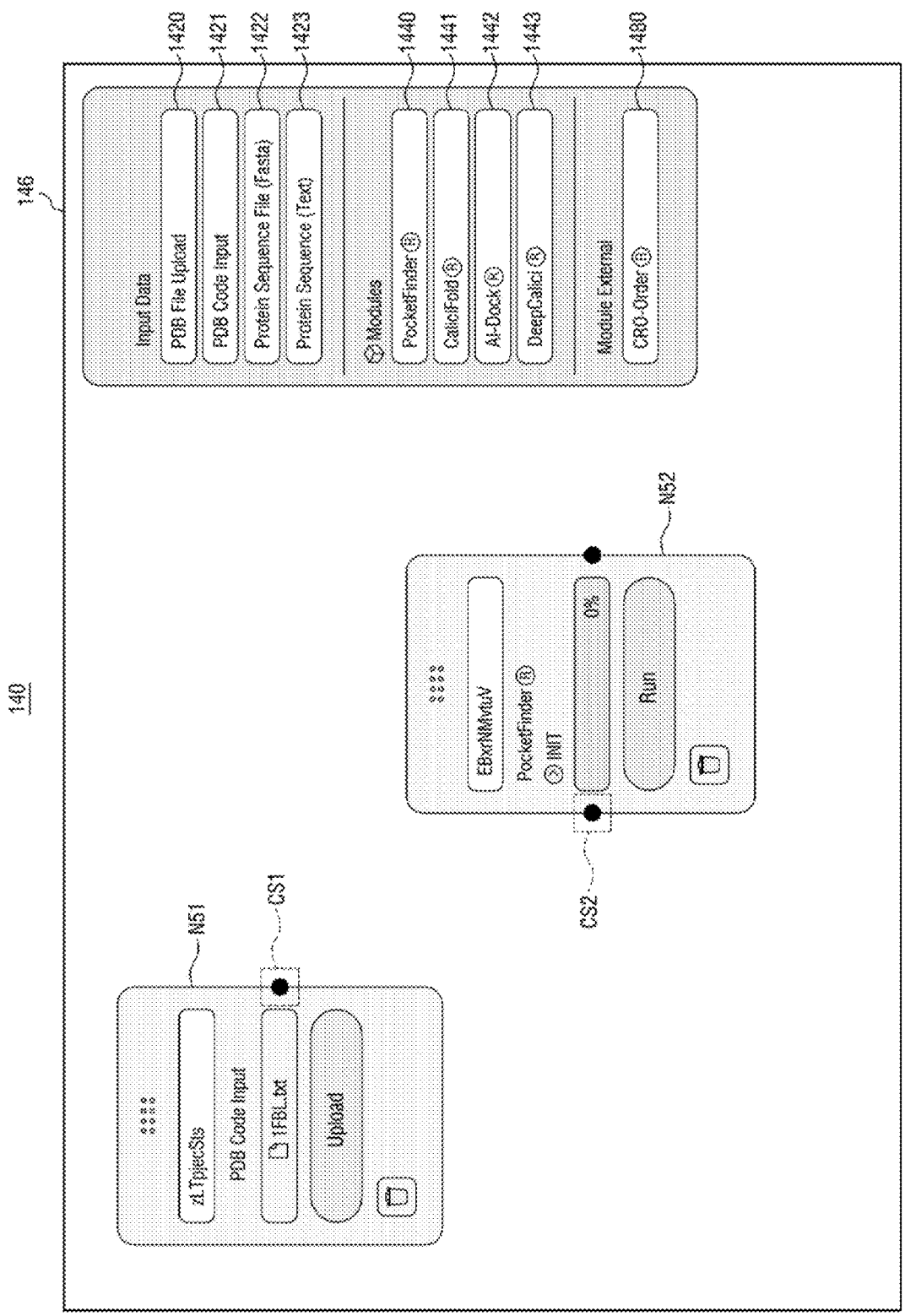

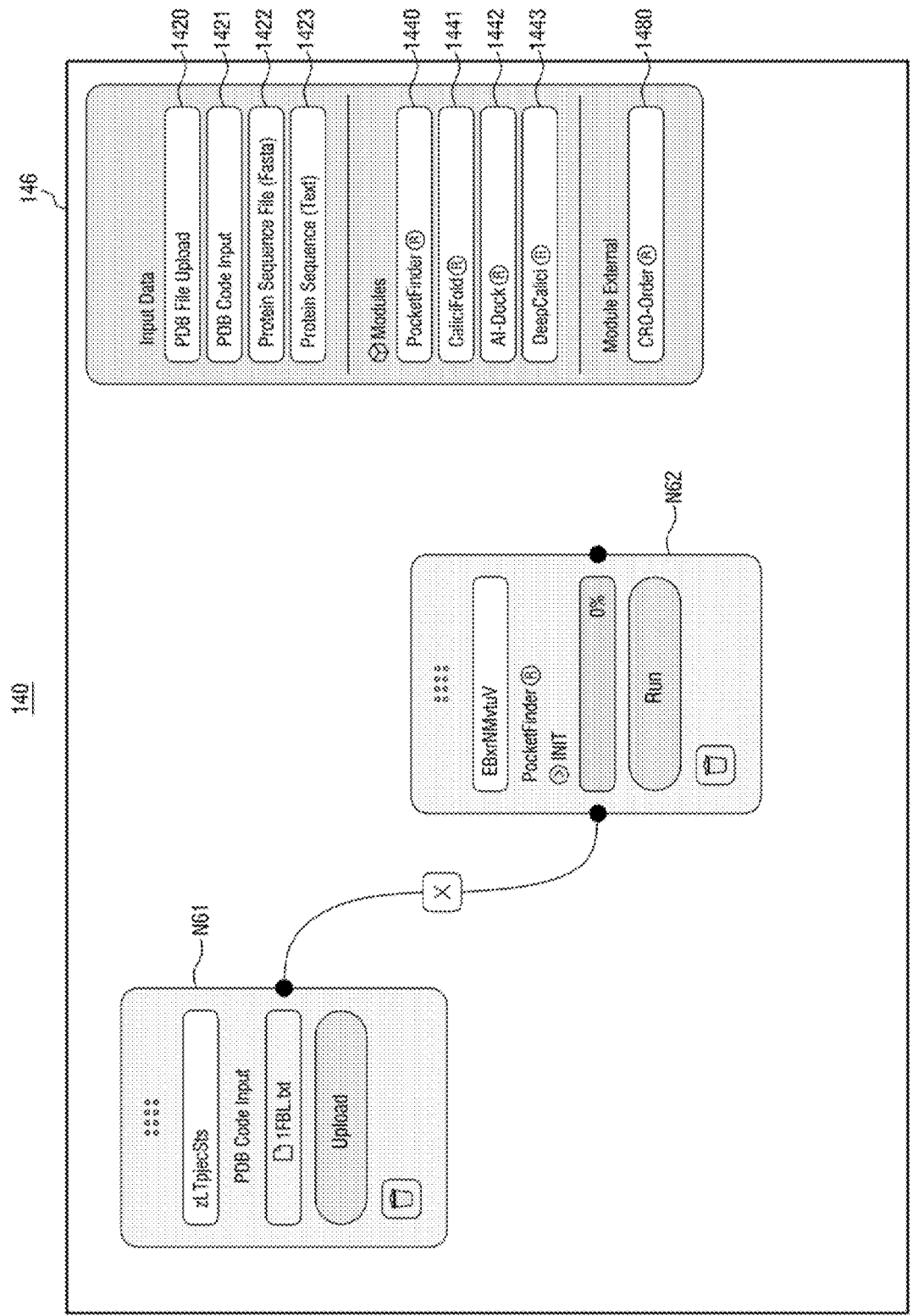
[Figure 6]

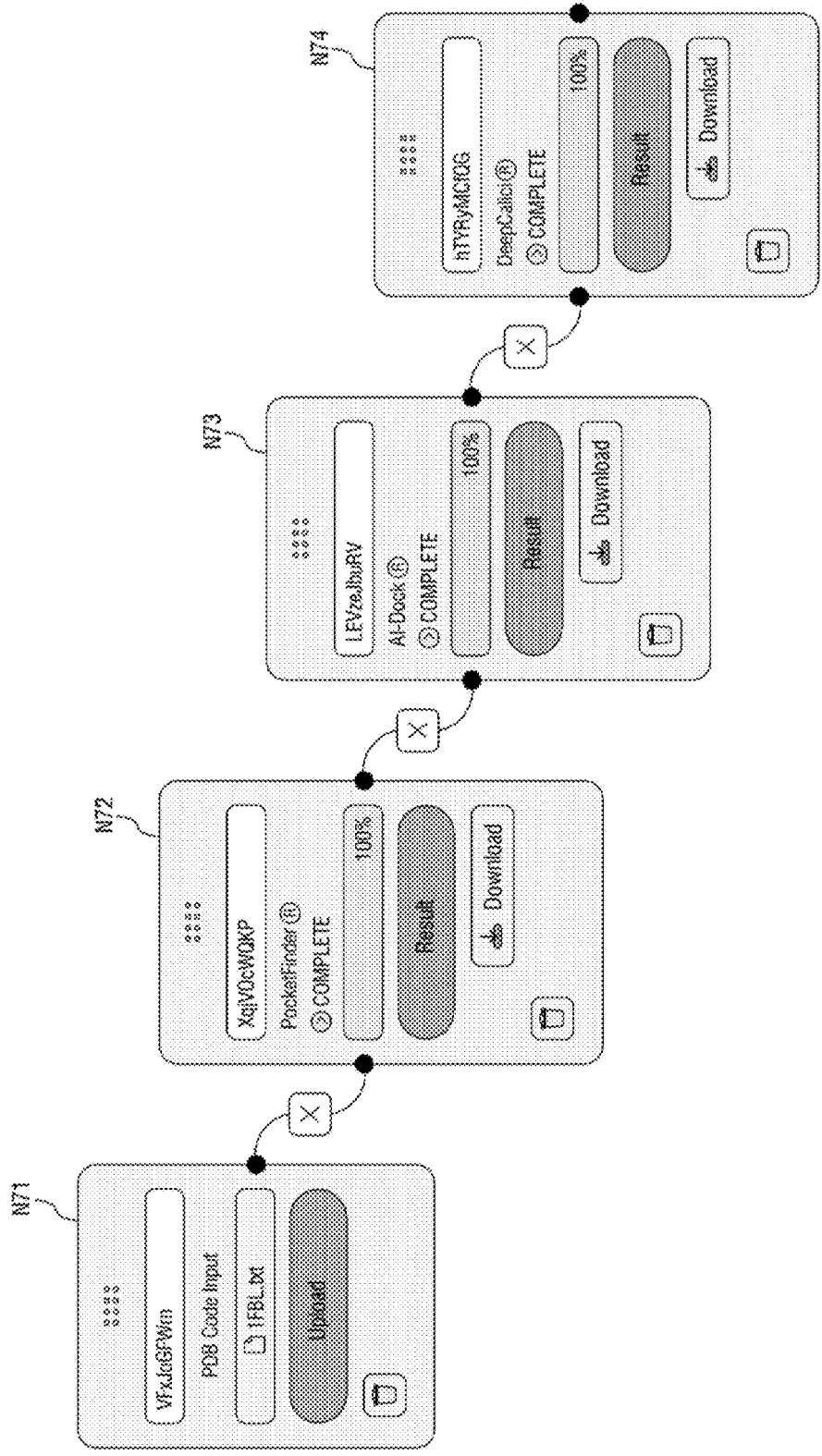
[Figure 7]

[Figure 8]
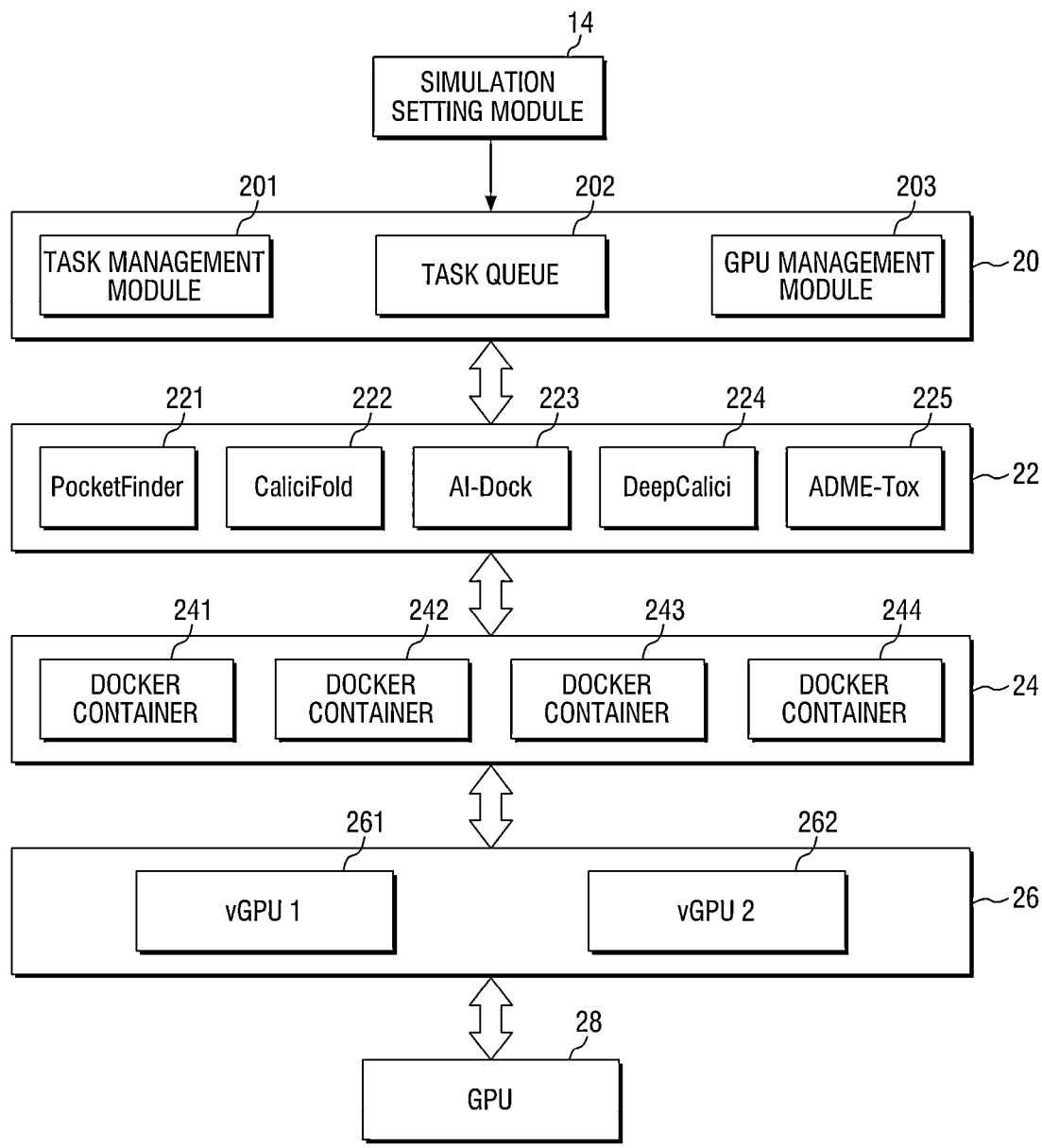

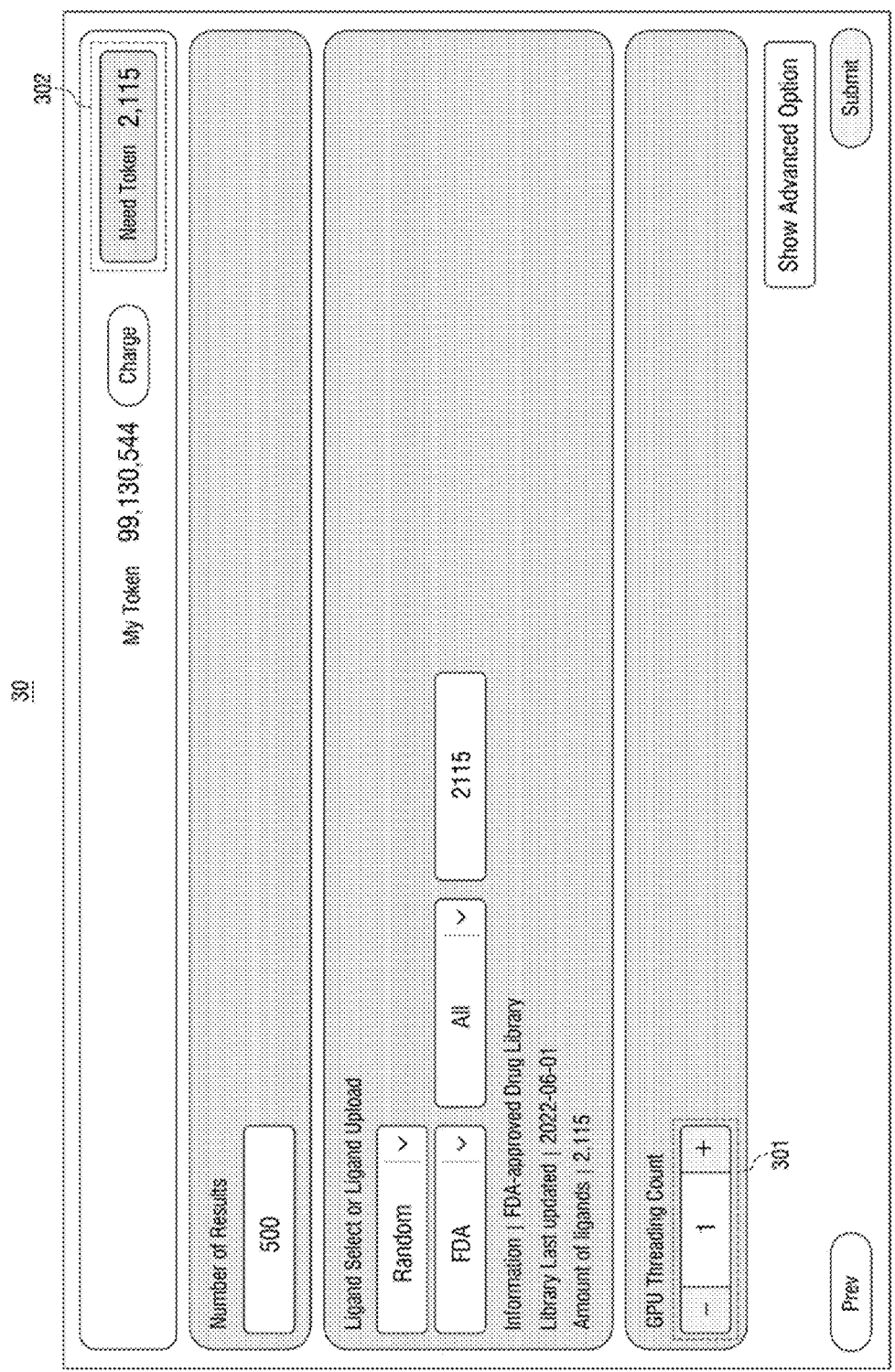
[Figure 9]

[Figure 10]

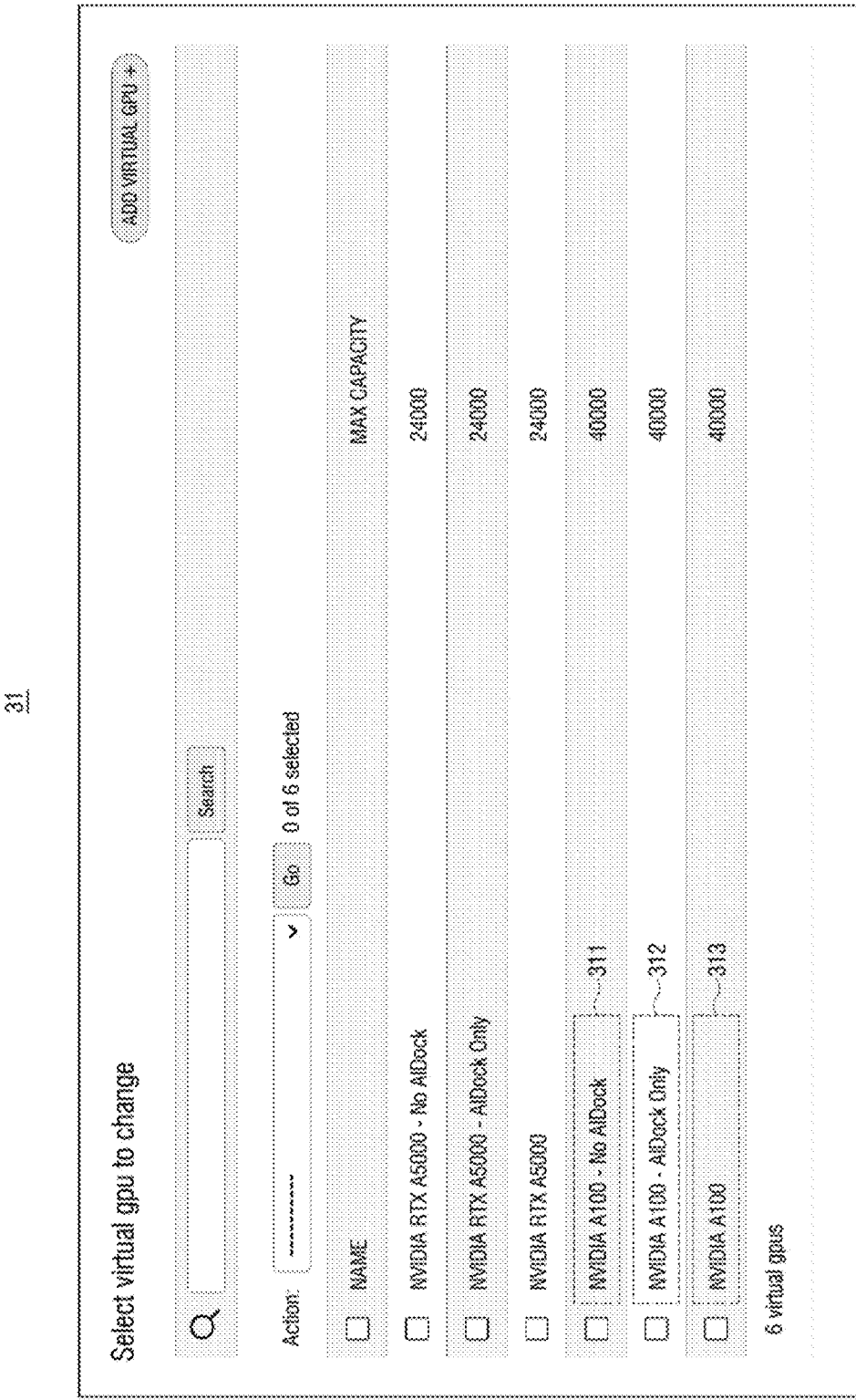
[Figure 11]

[Figure 12]
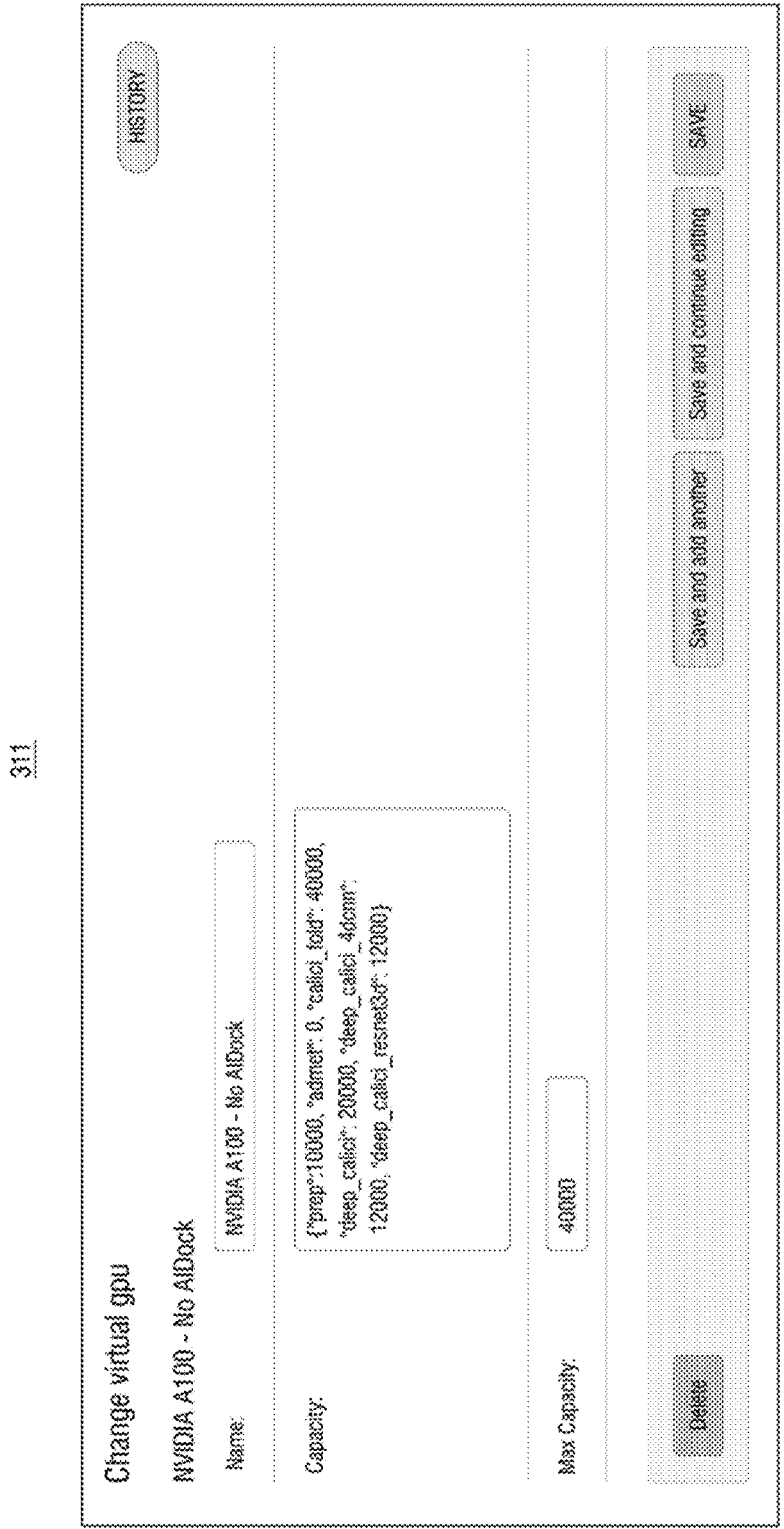

[Figure 13]
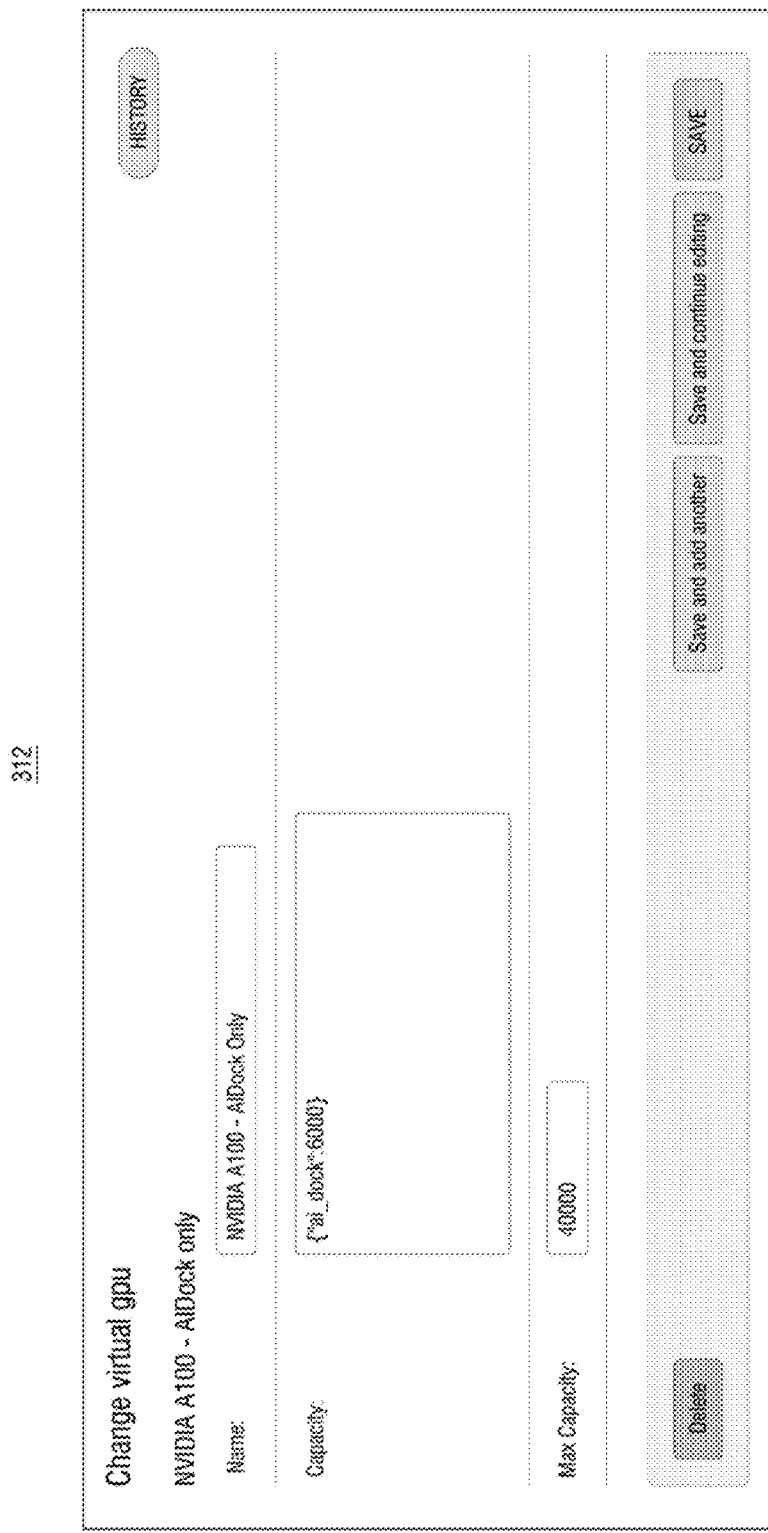

[Figure 14]
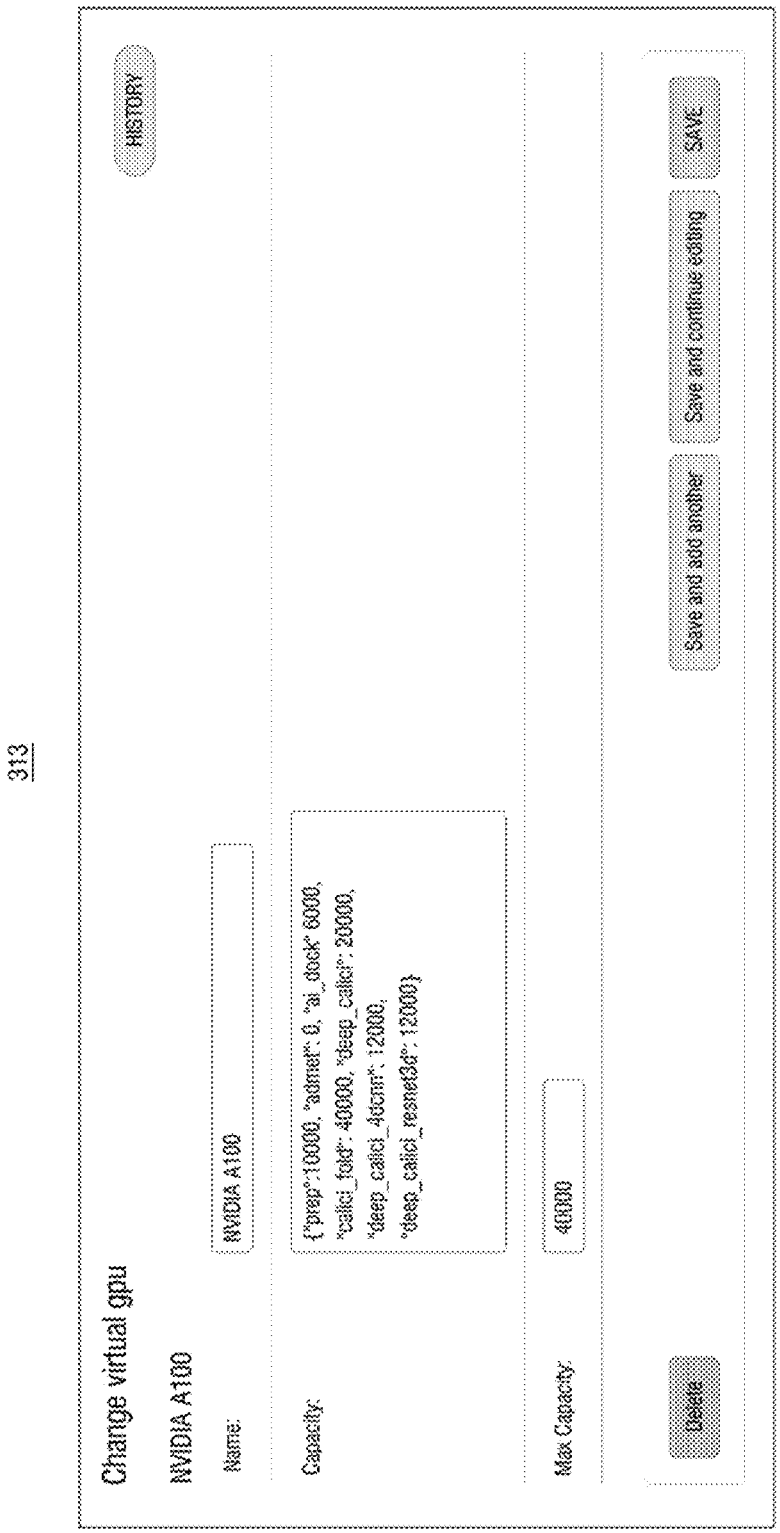

[Figure 15]

| NAME | GPU NAMES | PORT | TOTAL CAPACITY | REMAINING CAPACITY | USABLE |
|---|---|---|---|---|---|
| cal-tb01 ~321 | NVIDIA A100, NVIDIA A100 | 9999 | 80000 | 80000 | ◉ |

Select flask server to change

Action: ▾ Go  0 of 1 selected

ADD FLASK SERVER +

1 flask server

Change virtual gpu cai-tb01

Name: cai-tb01

Ip address: cai-tb01.domain.com

Port: 9999

☑ Usable

FLASK GPUS

| GPU ID | GPU TYPE | USABLE | DELETE |
|---|---|---|---|
| 0: NVIDIA A100 — 0 | NVIDIA A100 ✎ + | ☒ | ☐ |
| 1: NVIDIA A100 — 1 | NVIDIA A100 ✎ + | ☒ | ☐ |

+ Add another Flask gpu

Delete    Save and add another    Save and continue editing    SAVE

HISTORY

321

[Figure 17]
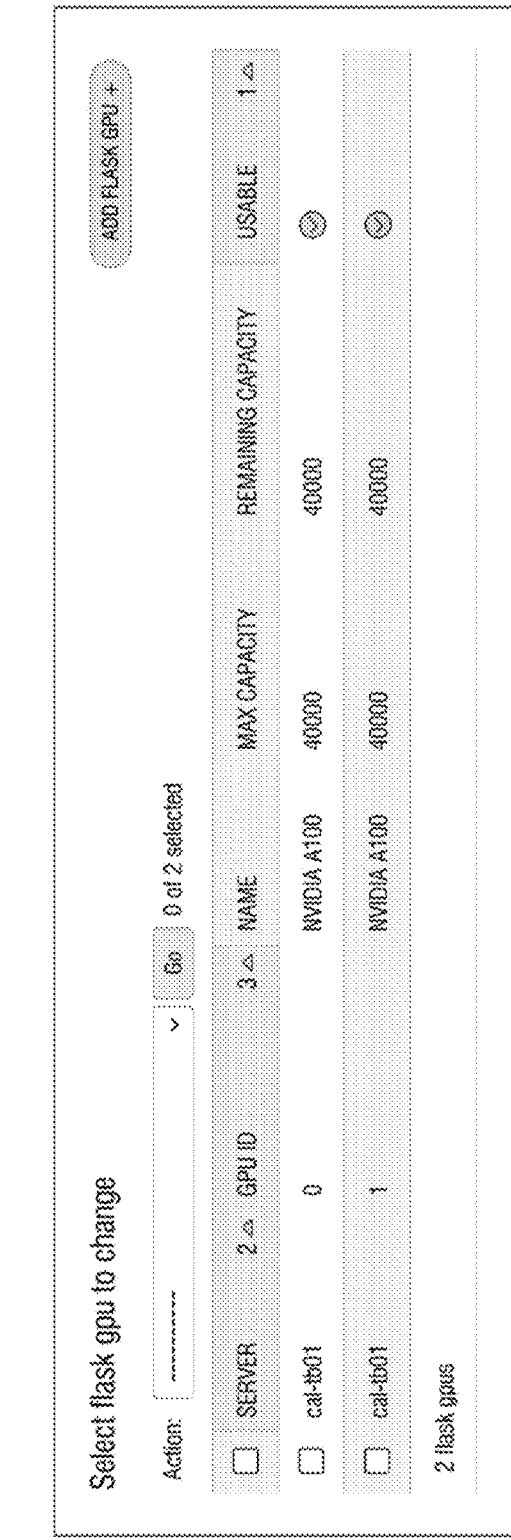

[Figure 18]

Select module queue to change

Action: [ dropdown ] [Go] 0 of 3 selected

| POSITION | FLASK URL | RELEASED | MODULE NAME | MODULE ID | THREADS |
|---|---|---|---|---|---|
| ☐ 0 | | ⊗ | PocketFinder | 615 | 1 |
| ☐ 1 | | ⊗ | AI-Dock | 617 | 4 |
| ☐ 2 | | ⊗ | DeepCalici | 618 | 1 |

3 module queue

Select module queue to change

Action: [dropdown] [Go]  0 of 3 selected

| ☐ | POSITION | FLASK URL | RELEASED | MODULE NAME | MODULE ID | THREADS |
|---|---|---|---|---|---|---|
| ☐ | 0 | ws://cat-tb01.domain.com:9999/ws/module.view | ◎ | PocketFinder | 615 | 1 |
| ☐ | 0 | ws://cat-tb01.domain.com:9999/ws/module.view | ◎ | AI-Dock | 617 | 4 |
| ☐ | 0 | ws://cat-tb01.domain.com:9999/ws/module.view | ◎ | DeepCalci | 618 | 1 |

3 module queues

Select gpu block to change

Action: [dropdown] [Go] 0 of 3 selected

| SERVER | GPU ID | BLOCKED CAPACITY | MODULE ID | THREADS |
|---|---|---|---|---|
| ☐ cat-tt01 | 0 | 24000 | 617 | 4 |
| ☐ cat-tt01 | 0 | 10000 | 615 | 1 |
| ☐ cat-tt01 | 1 | 20000 | 618 | 1 |

3 gpu blocks

35

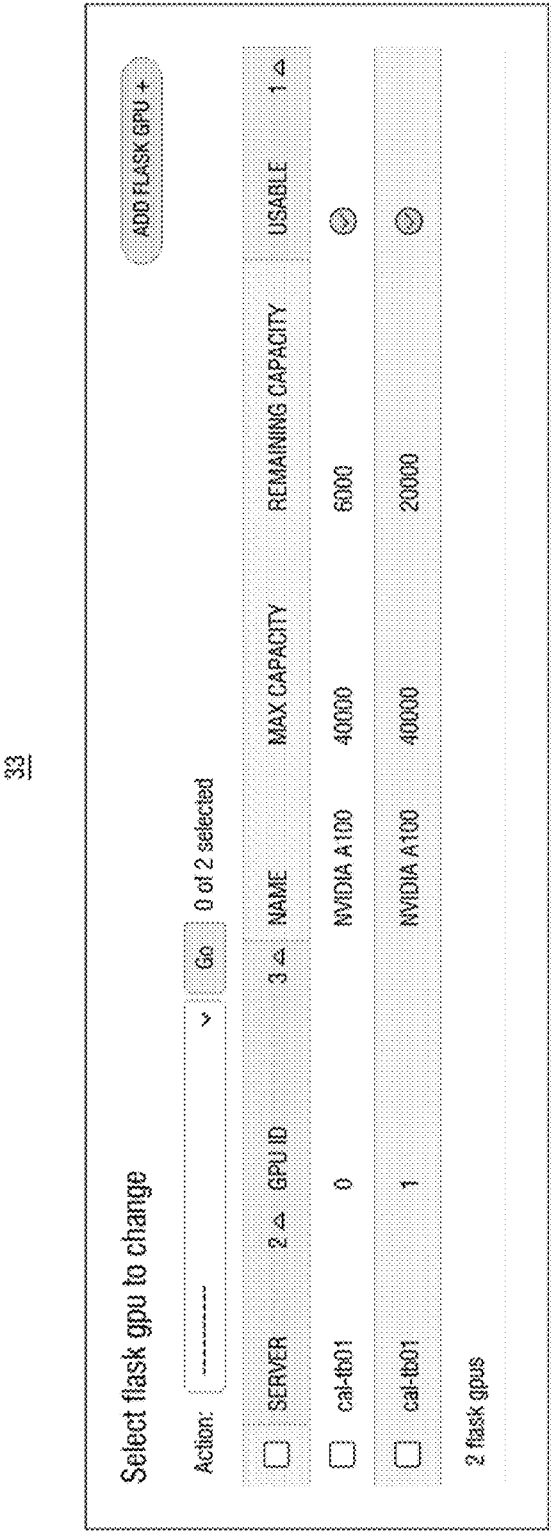
[Figure 21]

[Figure 22]

Select flask server to change

🔍 [_____]  [Search]

Action: [____ ▾] [Go] 0 of 1 selected

[ADD FLASK SERVER +]

| NAME | GPU NAMES | PORT | TOTAL CAPACITY | REMAINING CAPACITY | USABLE |
|---|---|---|---|---|---|
| ☐ cat-tb01 | NVIDIA A100, NVIDIA A100 | 9999 | 80000 | 26000 | ◉ |

1 flask server

32

[Figure 23]
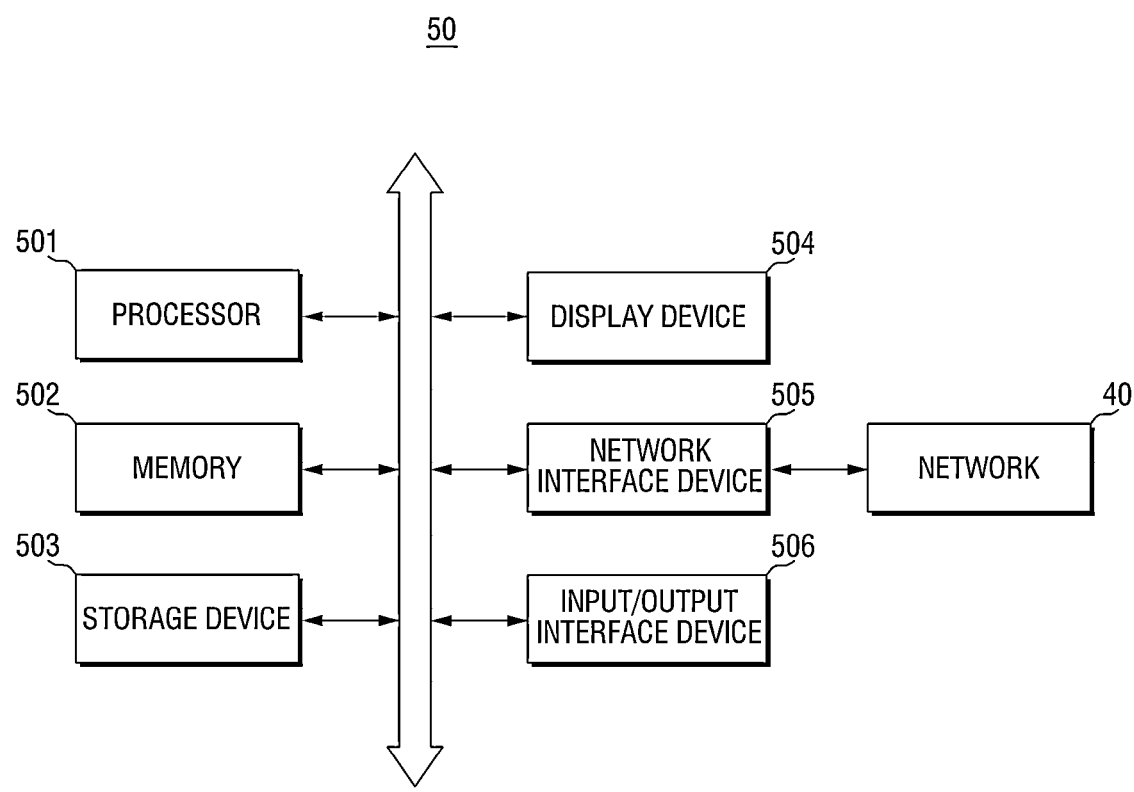

MULTI-INSTANCE GPU-BASED SYSTEM FOR DISCOVERING DRUG CANDIDATE

CROSS-REFERENCE TO RELATED APPLICATIONS

This is a National Stage of International Application No. PCT/KR2023/021355 filed Dec. 21, 2023, claiming priority based on Korean Patent Application No. 10-2023-0097539 filed Jul. 26, 2023 and Korean Patent Application No. 10-2023-0184594 filed Dec. 18, 2023, the entire disclosures of which are incorporated by reference herein.

TECHNICAL FIELD

Disclosure relates to a system for discovering a drug candidate, and more specifically, to a multi-instance GPU-based system for discovering a drug candidate.

BACKGROUND ART

The discovery of drug candidates represents an early stage in drug development, and structure-based in silico screening methods are gaining attention. Protein structure-based in silico screening identifies potential drug candidates from compound databases based on the three-dimensional structure of proteins to which the drug candidates could bind. The term "in silico" refers to computer-based simulations or virtual experiments using computer programming. Through in silico screening, the interactions between proteins and compounds can be simulated to predict the binding strength of compounds. Protein structure-based in silico screening offers advantages over ligand-based screening, which is dependent on known ligands and limited in identifying entirely novel chemical structures. By targeting the active site of a protein, this approach not only identifies compounds that fit precisely but is also useful for exploring new chemical spaces to discover novel compounds.

In the discovery of such drug candidates, where such principles are applied, there is a growing demand to integrate big data analysis technologies and artificial intelligence technologies with billions of compounds in chemical libraries, utilizing various analytical tools concurrently. To meet this demand, research laboratories in pharmaceutical companies or academic institutions have been installing and operating a variety of software. For example, the European Molecular Biology Laboratory (EMBL) develops and provides various tools for bioinformatics, which can be downloaded or accessed via simple web applications.

However, these tools are provided without account creation, making them difficult to use for pharmaceutical companies that require security. Additionally, it is challenging to share data among the provided tools, and since they are installed on various operating systems such as Windows, Mac, and Linux, consistent data management becomes difficult. In this context, data analysis tools like KNIME (Konstanz Information Miner) have emerged, offering efforts to visualize data processing in a single flowchart format. However, most of these data analysis tools are installation-based, reducing accessibility, and they are not specialized for drug discovery. As a result, significant effort and time are required to directly utilize them for discovering drug candidates.

DISCLOSURE

Technical Problem

A technical problem is to provide a drug candidate discovery system that enables detailed management of GPU resources tailored to user-specific needs in the discovery of drug candidates.

Technical Solution

A drug candidate discovery system according to an embodiment, implemented as a platform that provides functionalities or services required for drug candidate discovery to a user in the form of a web service, may include: a project management module configured to create a project for adding a task to perform drug candidate discovery, a simulation management module configured to create a simulation desired by a user on the created project; a simulation setting module configured to set a simulation workflow for the simulation based on input from a user, using a canvas area and a simulation setting area comprising a protein structure data input area and a task module selection area, each comprising one or more objects that can be dragged and dropped onto the canvas area and converted into a node; a simulation workflow management module configured to manage information on nodes that can precede or follow in the simulation workflow; and a simulation execution module configured to manage and execute a task for running the simulation workflow by dividing and allocating GPU resource to the respective nodes.

In some embodiments, the simulation execution module may include a task management module configured to schedule an execution of the task using a task queue, and a GPU management module configured to manage GPU based on a multi-instance GPU using a Docker container and execute the task scheduled by the task management module by utilizing a virtual GPU generated based on the GPU.

In some embodiments, the system may further include a task provisioning module configured to provide the task stored in the form of the Docker container to the simulation execution module.

In some embodiments, the task provisioning module may be configured to allocate to the Docker container and provide to the simulation execution module: a first task for automatically identifying an optimal docking site in a target protein structure, a second task for predicting the tertiary structure of a protein from an amino acid sequence, a third task for analyzing and sorting an actual binding energy (kcal/mol) and providing the analyzed binding energy to a user, a fourth task for converting kcal/mol into Kd/Ki (μM) for selected ligands and performing comparative analysis, and a fifth task for predicting absorption, distribution, metabolism, excretion, and toxicity based on the chemical structure of ligands.

In some embodiments, the system may be configured to display on a screen: a first user interface for receiving, from a user, the number of threads to be used to execute the task on a virtual GPU, and a second user interface for displaying, on the screen, the number of required tokens that a user must pay to execute the task, wherein the number of tokens increases or decreases based on the number of threads.

In some embodiments, the system may be configured to display a screen providing a list of a virtual GPU to the user, and the list may display: a name identifying the virtual GPU, information on a task module available for the virtual GPU, and a maximum capacity supported by the virtual GPU.

In some embodiments, wherein the system may be configured to display a first screen providing a list of a server to the user, and the list displayed on the first screen may include: a name identifying the server, information on a virtual GPU used by the server, port information used to access the server, a total capacity supported by the server, a remaining capacity currently available on the server, and a usability status of the server.

In some embodiments, the system may be configured to display a second screen providing a list of a virtual GPU used by the server to a user, and the list on the second screen may include: a name identifying the server, GPU ID information of the virtual GPU used by the server, type information of the virtual GPU used by the server, a maximum capacity supported by the virtual GPU, a currently available capacity on the virtual GPU, and a usability status of the virtual GPU.

In some embodiments, wherein the system may be configured to display a first screen providing a list of a task queue to a user, and the list on the first screen may include: position information of a task inserted into the task queue, URL information associated with the task, information on whether the task inserted into the task queue are released, a name of the task inserted into the task queue, an ID of the task, and the number of threads used to execute the task.

In some embodiments, whether the task inserted into the task queue is executable may be determined, and if the task is determined to be executable, the task may be executed, and executability of the task may be determined by comparing a capacity required for executing the task with a currently available capacity on the virtual GPU, and the task may be determined to be executable if the capacity required for executing the task does not exceed the currently available capacity on the virtual GPU, and not executable if the capacity required for executing the task exceeds the currently available capacity on the virtual GPU.

In some embodiments, the system may be configured to display a second screen providing a list to a user, the list including information on a blocked capacity during the execution of the task that was scheduled in the task queue.

In some embodiments, the protein structure data input area may include one or more objects related to a function of uploading protein structure data, and the one or more objects may be able to be dragged and dropped onto the canvas area and converted into: a first node configured to receive protein structure data in the form of a PDB (Protein Data Bank) file from a user, a second node configured to receive protein structure data in the form of a PDB code from a user, a third node configured to receive protein structure data in the form of a protein sequence file from a user, or a fourth node configured to receive protein structure data in the form of a protein sequence from a user.

In some embodiments, the task module selection area may include one or more objects related to functions for performing detailed tasks in drug candidate discovery based on the uploaded protein structure data, and the one or more objects may be able to be dragged and dropped onto the canvas area and converted into: a fifth node configured to identify an optimal docking site in a target protein structure, a sixth node configured to predict the tertiary structure of a protein from an amino acid sequence, a seventh node configured to analyze and sort actual binding energy (kcal/mol) and provide the analyzed binding energy to a user, or an eighth node configured to convert kcal/mol into Kd/Ki (μM) for selected ligands and perform comparative analysis.

In some embodiments, nodes that can precede the fifth node may include the first node, the second node, the third node, the fourth node, and the sixth node, and nodes that can follow the fifth node may include the seventh node.

In some embodiments, nodes that can precede the sixth node may include the third node, the fourth node, and the sixth node, and nodes that can follow the sixth node may include the fifth node.

In some embodiments, nodes that can precede the seventh node may include the fifth node, and wherein nodes that can follow the seventh node may include the eighth node.

In some embodiments, a node connection shape may be displayed on the node placed in the canvas area, and while a user clicks on a node connection shape displayed on the right side of a certain node, the color or shape of a node connection shape displayed on the left side of other connectable node may change.

In some embodiments, the simulation workflow management module may manage information for determining whether connections between nodes are possible through metadata.

Advantageous Effects

According to the embodiments, the system provides functions and a user interface optimized for drug candidate discovery. It improves upon the conventional issue where detailed tasks related to drug candidate discovery were provided through separate tools with low compatibility, making data sharing and consistent data management difficult. The system allows for easy management of simulation workflows by creating, modifying, and deleting nodes. Furthermore, it enables detailed and user-specific management of GPU resources required to execute the generated simulation workflows.

DESCRIPTION OF THE DRAWINGS

FIG. 1 is a block diagram illustrating a drug candidate discovery system according to an embodiment.

FIGS. 2 to 6 are diagrams showing example screens of a drug candidate discovery system according to an embodiment.

FIG. 7 is a diagram showing an example of simulation settings in a drug candidate discovery system according to an embodiment.

FIG. 8 is a block diagram illustrating a drug candidate discovery system according to an embodiment.

FIGS. 9 to 10 are diagrams illustrating an implementation example of a drug candidate discovery system according to an embodiment.

FIGS. 11 to 14 are diagrams illustrating an implementation example of a drug candidate discovery system according to an embodiment.

FIGS. 15 to 22 are diagrams illustrating an implementation example of a drug candidate discovery system according to an embodiment.

FIG. 23 is a block diagram for explaining a computing device according to an embodiment.

MODE FOR INVENTION

Hereinafter, the embodiments of the present invention will be described in detail with reference to the accompanying drawings so that those skilled in the art to which the present invention pertains can easily implement them. However, the present invention is not limited to the embodiments described herein and may be implemented in various different forms. Moreover, in order to clearly describe the present invention in the drawings, parts irrelevant to the description have been omitted, and similar reference numerals have been used for similar parts throughout the specification.

In the entire specification and claims, when a part is described as "including" a certain component, it means that, unless specifically stated otherwise, the inclusion of other components is not excluded and that other components may be further included.

Furthermore, the terms such as " . . . part," " . . . unit," and " . . . module" described in the specification may refer to units capable of processing at least one function or operation as described herein, and these units may be implemented as hardware, software, or a combination of hardware and software.

FIG. 1 is a block diagram illustrating a drug structure-based candidate discovery system according to an embodiment.

A drug candidate discovery system 1 according to an embodiment may be implemented as a platform that provides functionalities or services required for drug candidate discovery to users in the form of a web service. Specifically, the drug candidate discovery system 1 may provide various functionalities or services, such as enabling a biologist with specific ideas for drug development to utilize in silico screening methods without requiring knowledge in other fields; detecting and removing errors (or defects) in protein structure files; efficiently detecting enzymatically active pockets for docking calculation (EAPDC) from protein structures and providing them to the user; providing real-time ranking of candidates based on docking binding energy while performing docking simulations, which require a significant amount of time; predicting docking binding energy in two stages to enhance reliability; and even validating the discovered candidates through collaboration with verification agencies.

The drug candidate discovery system 1 may provide the same functionalities or services to users in various environments through a web interface. Specifically, for example, some users may use mobile devices such as smartphones or tablet computers running a mobile operating system to receive services from the drug candidate discovery system 1, while other users may use a laptop computer running a Windows operating system to access the services. Additionally, other users may use a desktop computer running a Linux operating system to receive services from the drug candidate discovery system 1. In other words, the drug candidate discovery system 1, implemented as a platform in the form of a web service, enables users in different environments to perform in silico candidate calculations using an artificial neural network and to utilize the same functionalities or services for preclinical experiments on the candidates. By doing so, the system enhances compatibility and user convenience and addresses several issues that previously required improvement in in silico calculations performed via terminal on Linux systems.

Referring to FIG. 1, the drug candidate discovery system 1 according to an embodiment may include a project management module 10, a simulation management module 12, a simulation setting module 14, and a simulation workflow management module 16.

The project management module 10 may create a project to which a series of tasks for performing the discovery of drug candidates may be added. Additionally, the project management module 10 may display the created project to the user through the display device of the computing device on which the drug candidate discovery system 1 is operating.

In some embodiments, the project management module 10 may perform project name encryption. For a project with project name encryption enabled, the project management module 10 may display the original, unencrypted project name to the user who created the project and to users authorized to access the project, while displaying the encrypted project name to users who do not have access rights to the project. Since project names may contain keywords related to drug candidate discovery that need to remain secure, preventing the project name from being directly exposed to users not involved in the same project enhances security in the drug candidate discovery system 1, which is used by multiple users. Enabling or disabling project name encryption can be performed not only when the project is created but also by changing the option settings after the project has been created.

In some embodiments, the project management module 10 may support project participation through invitation codes. For example, when a user creates a project, the user may send an invitation code to other users, and the recipients of the invitation code may join the project by entering the code. In other words, users may participate in projects created by others through invitation codes. This enables users with knowledge in different fields to collaborate on a single project to perform drug candidate discovery. Additionally, the project management module 10 may support permission settings for project members. For instance, the project management module 10 may grant administrator privileges to specific members among the project members. Furthermore, the project management module 10 may also allow a user participating in a project to leave the project if desired.

The simulation management module 12 may allow a user to create desired simulations on a project created by the project management module 10. A single simulation may include a plurality of task modules with specific functionalities for performing drug candidate discovery, and a single project may include multiple simulations. After creating a simulation, the user may upload protein structure data required to perform the plurality of task modules.

The simulation setting module 14 may display a simulation setting area 140 to the user through the display device of the computing device on which the drug candidate discovery system 1 is operating when the user selects one or more simulations managed by the simulation management module 12. In the simulation setting area 140, the user may configure the simulation workflow by arranging and connecting a plurality of task modules based on graph computing to perform the desired simulation. Specifically, the simulation setting area 140 may be laid out to allow the user to intuitively recognize functionalities for uploading protein structure data and task modules that perform detailed tasks related to drug candidate discovery based on the uploaded protein structure data. This configuration addresses the conventional issue where detailed tasks for drug candidate discovery were provided as separate tools with low compatibility, making data sharing and consistent data management challenging. The simulation setting area 140 may include a protein structure data input area 142, a task module selection area 144, and a canvas area 146.

The protein structure data input area 142 may include one or more objects that can be dragged and dropped onto the canvas area 146. For example, the protein structure data input area 142 may include a first object through a fourth object. The first object may be dragged and dropped onto the canvas area 146 and converted into a first node, which may receive protein structure data in the form of a PDB (Protein Data Bank) file from the user. The second object may be dragged and dropped onto the canvas area 146 and converted into a second node, which may receive protein structure data in the form of a PDB code from the user. The third object may be dragged and dropped onto the canvas area 146 and converted into a third node, which may receive protein structure data in the form of a protein sequence file from the user. The fourth object may be dragged and dropped onto the canvas area 146 and converted into a fourth node, which may receive protein structure data in the form of a protein sequence from the user.

The task module selection area 144 may also include one or more objects that can be dragged and dropped onto the canvas area 146. For example, the task module selection area 144 may include a fifth object through an eighth object. The fifth object may be dragged and dropped onto the canvas area 146 and converted into a fifth node, which may perform a task to identify optimal docking sites on the target protein structure. Specifically, the fifth node may utilize an artificial intelligence language model based on NLP (Natural Language Processing) to automatically identify active sites on the target protein and generate an optimal docking grid box. Additionally, the fifth node may automatically correct various errors that may exist in protein structure files (i.e., PDB files). In particular, the fifth node may detect and remove anisotropic B-factors in PDB files, detect alternative conformations in residue fields and modify them into non-alternative conformations, and detect unusual amino acids in residue fields to automatically modify them into one of the 20 standard amino acids. The sixth object may be dragged and dropped onto the canvas area 146 and converted into a sixth node, which may predict the tertiary structure of a protein from its amino acid sequence. The seventh object may be dragged and dropped onto the canvas area 146 and converted into a seventh node, which may analyze the actual binding energy (kcal/mol) and provide the results to the user in order of the most favorable binding. Specifically, the seventh node may perform grid-based in silico docking based on the input protein structure, determine chemical poses using the Lamarckian Genetic Algorithm (LGA), and calculate binding energy using an empirical scoring function. The eighth object may be dragged and dropped onto the canvas area 146 and converted into an eighth node, which may select a desired ligand, convert kcal/mol into Kd/Ki (μM) and perform comparative analysis. Specifically, the eighth node may predict Kd/Ki values in μM units using a CNN artificial intelligence model trained on protein-ligand structures and Kd/Ki/IC50 values.

The first through eighth objects can be dragged and dropped onto the canvas area 146 and converted into the first through eighth nodes, respectively. Users may freely arrange the first through eighth nodes on the canvas area 146 in any desired execution order according to the purpose and environment of the simulation. Additionally, users may establish connections between the first through eighth nodes placed on the canvas area 146 by setting edges. By arranging nodes and connecting edges between them, users can create drug candidate discovery simulations. Furthermore, as the number of nodes placed on the canvas area 146 increases and the edges between the nodes grow, resulting in increased complexity in the simulation workflow, users can manage protein structure data input information clearly and efficiently by creating, modifying, and deleting nodes.

In some embodiments, the simulation setting area 140 may further include an external module provision area 148. The external module provision area 148 may include a ninth object that can be dragged and dropped onto the canvas area 146 and converted into a ninth node with arbitrary functionalities provided from outside the drug candidate discovery system 1. This allows functionalities provided by other systems operating in conjunction with the drug candidate discovery system 1 to be easily incorporated into simulations by setting nodes in the canvas area 146.

As described above, users can click and drag desired objects from the protein structure data input area 142, the task module selection area 144, and the external module provision area 148, and drop them onto the canvas area 146 to place and freely move nodes. In some embodiments, node connection shapes may be displayed on the nodes placed in the canvas area 146. While the user clicks on a node connection shape displayed on the right side of a node, the color or shape of the node connection shapes displayed on the left side of other connectable nodes may change. The user cannot establish connections with nodes where the color of the node connection shapes on the left side remains unchanged and can only establish connections with nodes where the color of the node connection shapes on the left side has changed. This prevents users from creating invalid simulation workflows by allowing them to rely on the color changes of the node connection shapes to determine valid connections, without needing to be aware of whether causal relationships between the nodes can be established.

The information for determining whether connections between nodes are possible may be managed by the simulation workflow management module 16. The simulation workflow management module 16 may manage information about nodes that can precede or follow in the simulation settings and, if necessary, may utilize separate data structures, such as metadata. Additionally, the simulation workflow management module 16 may update the information, such as reflecting changes in the metadata, when the information about nodes that can precede or follow is modified.

While clicking on a node connection shape displayed on the right side of a node, a user may establish a connection to another node where the color of the node connection shape displayed on its left side has changed. The user may establish the connection either by clicking the node connection shape on one node and then clicking the node connection shape on another node or by clicking and dragging the node connection shape from one node to the node connection shape of another node. Once the connection is completed, a connection line is displayed between the nodes. The user may remove the connection by clicking the "X" displayed on the connection line.

Objects included in the task module selection area 144 may generate a run button within the node when converted into nodes on the canvas area 146. Users may click the run button to execute the task associated with the node. Before the task begins, the number of tokens required to perform the task may be displayed, and the task may proceed after the user confirms and the tokens are deducted. Once the task is completed, the run button may change to a result button, and a download button may additionally be generated. Users may click the result button to view the task results and click the download button to download the task results.

In this way, users may create a simulation workflow tailored for optimal compound development by configuring the relationships between nodes, each having specific functionalities, in the drug candidate discovery process. Additionally, even when new functionalities are added internally to the drug candidate discovery system 1 or introduced externally, nodes corresponding to the added functionalities may be generated, allowing users to easily establish connections with existing nodes.

FIGS. 2 to 6 are diagrams showing example screens of a drug candidate discovery system according to an embodiment.

Referring to FIG. 2, the simulation setting area 140 may include a protein structure data input area 142, a task module selection area 144, a canvas area 146, and an external module provision area 148. As illustrated, the protein structure data input area 142 may include one or more objects related to functionalities for uploading protein structure data, the task module selection area 144 may include one or more objects related to detailed tasks for drug candidate discovery performed based on the uploaded protein structure data, and the external module provision area 148 may include one or more objects related to arbitrary functionalities provided externally. These objects may be dragged and dropped onto the canvas area 146 by the user and converted into nodes. The nodes may be connected by edges to form a graph, which represents the simulation workflow. Of course, the number or types of objects included in the task module selection area 144, the canvas area 146, and the external module provision area 148, as depicted in the drawings, are examples provided for illustrative purposes to explain the embodiments and are not intended to limit the scope of the invention to what is shown.

Referring to FIG. 3, the protein structure data input area 142 may include a first object 1420, a second object 1421, a third object 1422, and a fourth object 1423. The first object 1420, labeled "PDB File Upload," is related to the functionality for receiving protein structure data in the form of PDB files. The second object 1421, labeled "PDB Code Input," is related to the functionality for receiving protein structure data in the form of PDB codes. The third object 1422, labeled "Protein Sequence File (Fasta)," is related to the functionality for receiving protein structure data in the form of protein sequence files. The fourth object 1423, labeled "Protein Sequence (File)," is related to the functionality for receiving protein structure data in the form of protein sequences.

Meanwhile, the task module selection area 144 may include a fifth object 1440, a sixth object 1441, a seventh object 1442, and an eighth object 1443. The fifth object 1440, labeled "PocketFinder," is related to the functionality for automatically identifying optimal docking sites. The sixth object 1441, labeled "CaliciFold," is related to the functionality for predicting the tertiary structure of a protein from its amino acid sequence. The seventh object 1442, labeled "AI-Dock," is related to the functionality for analyzing the actual binding energy (kcal/mol) and automatically sorting them in the most favorable order. The eighth object 1443, labeled "DeepCalici," is related to the functionality for converting kcal/mol into Kd/Ki (µM) and performing comparative analysis.

In some embodiments, the fifth object 1440 may automatically process PDB files containing protein structure data input by the user by detecting and removing anisotropic B-factors, detecting alternative conformations in residue fields and modifying them into non-alternative conformations, and detecting unusual amino acids in residue fields and modifying them into one of the 20 standard amino acids. For example, if docking simulations are performed without removing anisotropic B-factors from a PDB file, errors may occur, such as the inability to recognize the PDB file format or to read the PDB file. Similarly, if docking simulations are performed with alternative conformations or unusual amino acids present in the residue fields, errors may occur due to the presence of unknown amino acids. These issues may reduce the accuracy of in silico screening methods or increase the failure rate of drug candidate discovery. By automatically handling such error-inducing factors, the fifth object 1440 prevents inefficiencies and inaccuracies that may arise from users manually editing PDB files. It eliminates the need for collaboration with structural biologists and automates the preprocessing of PDB files internally, such that users do not need to be aware of the preprocessing steps. This allows users to focus entirely on candidate discovery, providing an efficient and streamlined environment for their work. Additionally, in some embodiments, the fifth object 1440 may perform modifications for missing residues in the protein structure of a PDB file. Specifically, it may inspect gaps between residues in the protein structure of the PDB file to detect missing residues. When missing residues are found, the fifth object 1440 may retrieve appropriate protein amino acid sequences from a sequence database to complete the missing residues and automatically fill in the missing residues using the retrieved protein amino acid sequences. As a result, subsequent tasks may be performed based on an error-free protein structure file, where potential errors in the simulation have been eliminated.

The fifth object 1440 may detect an enzymatically active pocket for docking calculation (EAPDC) from a protein structure file to determine the docking site. Specifically, the fifth object 1440 may predict docking sites (i.e., EAPDC) on the target protein structure using an artificial intelligence language model. Specifically, the fifth object 1440 may calculate the depth values of pockets based on the solvent-accessible surface (SAS) of the target protein's surface, generate a gradient class activation map for amino acids contributing to the prediction of the target protein's activity, and determine the docking site as the region of the target protein with the highest influence on its activity. This determination is made by considering the pocket depth values and the values of highly contributing amino acids identified in the gradient class activation map. Here, the gradient class activation map may be extracted from a graph convolutional network (GCN) trained using an enzyme commission (EC) number or gene ontology (GO) number, implemented in an embedding layer of a natural language processing model. The natural language processing model implemented in the embedding layer may be a transformer-based model.

Meanwhile, the external module provision area 148 includes a ninth object 1480. The ninth object 1480, labeled "CRO-Order," is related to the functionality of sending a verification request for the desired candidate to a verification agency server.

As shown in FIG. 3, for example, the user may drag and drop the first object 1420, labeled "PDB File Upload," onto the canvas area 146, where it may be converted into a node N31. The node N31 may include a button for receiving protein structure data in the form of PDB files. Additionally, the node N31 may display related information such as the identifier of the node and the task execution status. The node N31 may also include a button for deleting itself. As illustrated by the example of the node N31, the second object 1421 through the ninth object 1480 may also be dragged and dropped onto the canvas area 146, where they may be converted into nodes that display their unique buttons, information, and other features.

As shown in FIG. 4, the user may drag and drop the second object 1421, labeled "PDB Code Input," onto the canvas area 146, where it may be converted into a node N41. The node N41 may include a button for receiving protein structure data in the form of PDB codes. Subsequently, the user may drag and drop the fifth object 1440, labeled "PocketFinder," onto the canvas area 146, where it may be converted into a node N42. The node N42 may include a button for performing the functionality of automatically identifying optimal docking sites.

As shown in FIG. 5, node connection shapes may be displayed on nodes placed in the canvas area 146. Specifically, a node connection shape CS1 may be displayed on the right side of node N51, and a node connection shape CS2 may be displayed on the left side of node N52. While the user clicks on the node connection shape CS1 displayed on the right side of node N51, the color or shape of the node connection shape displayed on the left side of another node N52, which is connectable, may change. The user cannot establish connections with nodes where the color of the node connection shape on the left side has not changed and may only establish connections with nodes where the color of the node connection shape on the left side has changed. The change in the color or shape of the node connection shape CS1 displayed on the left side of a connectable node N52 while the user is clicking on the node connection shape CS1 of node N51 is determined based on information about nodes that can precede or follow, provided by the simulation workflow management module 16.

As shown in FIG. 6, while clicking on the node connection shape CS1 displayed on the right side of a node N61, the user may establish a connection to another node N62 where the color of the node connection shape CS2 displayed on its left side has changed. The connection can be established either by clicking the node connection shape CS1 of node N61 and then clicking the node connection shape CS2 of node N62, or by clicking and dragging the node connection shape CS1 of node N61 to the node connection shape CS2 of node N62. Once the connection is completed, a connection line is displayed between the nodes. The user can remove the connection by clicking the "X" displayed on the connection line.

FIG. 7 is a diagram showing an example of simulation settings in a drug candidate discovery system according to an embodiment.

Referring to FIG. 7, an example of a created simulation workflow is shown with nodes N71 through N74. The node connection shape on the right side of node N71, which receives protein structure data in the form of PDB codes, is connected by an edge to the node connection shape on the left side of node N72, which automatically identifies optimal docking sites. Similarly, the node connection shape on the right side of node N72 is connected by an edge to the node connection shape on the left side of node N73, which analyzes and automatically sorts the actual binding energy (kcal/mol). Additionally, the node connection shape on the right side of node N73 is connected by an edge to the node connection shape on the left side of node N74, which converts kcal/mol into Kd/Ki (μM) and performs comparative analysis. As explained earlier, users cannot establish connections to nodes where the color of the node connection shape on the left side has not changed. Connections can only be established to nodes where the color of the node connection shape on the left side has changed. This eliminates the need for users to consider whether nodes can precede or follow one another, thereby improving convenience in drug candidate discovery workflows.

In some embodiments, information about nodes that can precede or follow may be predetermined as follows.

TABLE 1

| Preceding Node | Node | Following Node |
| --- | --- | --- |
| PDB File Upload<br>PDB Code Input<br>Protein Sequence File (Fasta)<br>Protein Sequence (Text)<br>CaliciFold | PocketFinder | AI-Dock |
| Protein Sequence File (Fasta)<br>Protein Sequence (Text) | CaliciFold | PocketFinder |
| PocketFinder | AI-Dock | DeepCalici |
| AI-Dock | DeepCalici | — |

For the node that automatically identifies optimal docking sites ("PocketFinder"), preceding nodes may include the node that receives protein structure data in the form of PDB files ("PDB File Upload"), the node that receives protein structure data in the form of PDB codes ("PDB Code Input"), the node that receives protein structure data in the form of protein sequence files ("Protein Sequence File (Fasta)"), the node that receives protein structure data in the form of protein sequences ("Protein Sequence (Text)"), and the node that predicts the tertiary structure of a protein from its amino acid sequence ("CaliciFold"). Following nodes may include the node that analyzes and automatically sorts the actual binding energy (kcal/mol) ("AI-Dock").

For the node that predicts the tertiary structure of a protein from its amino acid sequence ("CaliciFold"), preceding nodes may include the node that receives protein structure data in the form of protein sequence files ("Protein Sequence File (Fasta)") and the node that receives protein structure data in the form of protein sequences ("Protein Sequence (Text)"), Following nodes may include the node that automatically identifies optimal docking sites ("PocketFinder").

For the node that analyzes and automatically sorts the actual binding energy (kcal/mol) ("AI-Dock"), preceding nodes may include the node that automatically identifies optimal docking sites ("PocketFinder"). Following nodes may include the node that converts kcal/mol into Kd/Ki (μM) and performs comparative analysis ("DeepCalici").

For the node that converts kcal/mol into Kd/Ki (μM) and performs comparative analysis ("DeepCalici"), preceding nodes may include the node that analyzes and automatically sorts the actual binding energy (kcal/mol) ("AI-Dock").

Such information about nodes that can precede or follow may be managed by the simulation workflow management module 16, which may utilize separate data structures, such as metadata, if necessary. Additionally, the simulation workflow management module 16 may update the information, including reflecting changes in metadata when the information about nodes that can precede or follow is modified. In this way, a simulation workflow suitable for optimal compound development may be created by configuring the connections between nodes, each having specific functionalities, in the drug candidate discovery process.

In conventional simulation methods, conducting complex simulations for drug candidate discovery, which requires multiple attempts in various ways, demanded significant effort, time, and cost, while achieving satisfactory simulation settings was challenging. The graph computing-based simulation configuration method described through the embodiments improves upon conventional methods, enabling the intuitive and effortless creation and management of complex simulation workflows, as illustrated, while providing flexibility and convenience for easy modifications. It also allows the execution of highly intricate and complex simulation workflows.

FIG. 8 is a block diagram illustrating a drug candidate discovery system according to an embodiment.

Referring to FIG. 8, a drug candidate discovery system 1 according to an embodiment may include a simulation execution module 20, a task provisioning module 22, a Docker container provisioning module 24, and a GPU 28, wherein a virtual GPU (GPU instance) 26 may be generated based on the GPU 28.

The simulation execution module 20 may manage and execute tasks constituting a simulation workflow based on the simulation workflow configured by a user and provided by the simulation setting module 14. The simulation execution module 20 may include a task management module 201, a task queue 202, and a GPU management module 203.

The task management module 201 may schedule the execution of tasks required to run the simulation workflow to be executed. Specifically, the task management module 201 may insert tasks into the task queue 202 to execute the simulation workflow configured by a user by dragging, dropping, placing, and connecting nodes representing task modules based on graph computing. Additionally, it may delete tasks from the task queue 202 and execute the deleted tasks using GPU resources. In some embodiments, the task queue 202 may be implemented as a FIFO (First In First Out) queue. However, the scope of the present invention is not limited thereto, and the task queue 202 may be implemented in various forms using other data structures.

The GPU management module 203 may manage the GPU 28 and cooperate with the Docker container provisioning module 24 to execute tasks scheduled by the task management module 201 using the GPU 28. Specifically, the GPU management module 203 may allocate tasks to GPU instances 26 generated based on the GPU 28 and execute the tasks.

The task provisioning module 22 may provide detailed tasks required to execute a simulation workflow to the simulation execution module 20. Specifically, the task provisioning module 22 may provide the first task 221 through the fifth task 225 for performing drug candidate discovery. The first task 221, referred to as "PocketFinder," involves automatically identifying the optimal docking site in a target protein structure. The first task 221 corresponds to a task instance generated by a user dragging and dropping an object labeled "PocketFinder" in the task module selection area 144 of the simulation setting area 140 onto the canvas area 146, where the object is converted into a node. The second task 222, referred to as "CaliciFold," involves predicting the tertiary structure of a protein from an amino acid sequence. The second task 222 corresponds to a task instance generated by a user dragging and dropping an object labeled "CaliciFold" in the task module selection area 144 of the simulation setting area 140 onto the canvas area 146, where the object is converted into a node. The third task 223, referred to as "AI-Dock," involves analyzing and sorting actual binding energy (kcal/mol) and providing the results to the user. The third task 223 corresponds to a task instance generated by a user dragging and dropping an object labeled "AI-Dock" in the task module selection area 144 of the simulation setting area 140 onto the canvas area 146, where the object is converted into a node. The fourth task 224, referred to as "DeepCalici," involves converting kcal/mol into Kd/Ki (µM) for selected ligands and performing comparative analysis. The fourth task 224 corresponds to a task instance generated by a user dragging and dropping an object labeled "DeepCalici" in the task module selection area 144 of the simulation setting area 140 onto the canvas area 146, where the object is converted into a node. The fifth task 225, referred to as "ADME-Tox," involves predicting absorption, distribution, metabolism, excretion, and toxicity based on the chemical structure of ligands. The fifth task 225 corresponds to a task instance generated by a user dragging and dropping an object labeled "ADME-Tox" in the task module selection area 144 of the simulation setting area 140 onto the canvas area 146, where the object is converted into a node. In other words, the task provisioning module 22 may provide "instantiated task modules" corresponding to elements of a simulation workflow set by dragging and dropping objects onto the canvas area 146 for actual execution.

The GPU 28 may support Multi-Instance GPU (MIG) technology. By supporting MIG, a single GPU may be divided into multiple independent virtual GPUs, and each virtual GPU generated in this way may be allocated its own memory, CUDA (Compute Unified Device Architecture) cores, and other resources. In some embodiments, a first virtual GPU 261 and a second virtual GPU 262 may be generated based on the GPU 28. A value representing the capacity may be set for the GPU 28, and a value representing the capacity may also be set for each virtual GPU 26. Furthermore, a value representing the capacity may be set for each task 221, 222, 223, 224, and 225. Here, the capacity value of the virtual GPU 26 may not exceed the capacity value of the GPU 28. Additionally, the capacity set for each task 221, 222, 223, 224, and 225 may represent the capacity required to execute the task.

The Docker container provisioning module 24 may provide one or more Docker containers 241, 242, 243, and 244. The Docker containers 241, 242, 243, and 244 may be used to independently allocate virtual GPUs for various tasks related to drug candidate discovery. Since the Docker containers 241, 242, 243, and 244 are executed in independent environments, issues occurring in one container 241 may not affect another container 242, ensuring security and stability. Meanwhile, as the Docker containers 241, 242, 243, and 244 may be executed simultaneously, different tasks for drug candidate discovery may be processed in parallel, enhancing scalability.

A single task for performing drug candidate discovery may be allocated to a single Docker container. For example, the first task 221, which involves automatically identifying the optimal docking site in a target protein structure, may be allocated to Docker container 241. The second task 222, which involves predicting the tertiary structure of a protein from an amino acid sequence, may be allocated to Docker container 242. Additionally, the third task 223, which involves analyzing and sorting actual binding energy (kcal/mol) and providing the results to a user, may be allocated to Docker container 243, and the fourth task 224, which involves converting kcal/mol into Kd/Ki (µM) for selected ligands and performing comparative analysis, may be allocated to Docker container 244. For instance, the Docker container 241 allocated to the first task 221 may be executed on the first virtual GPU 261, and the Docker container 242 allocated to the second task 222 may be executed on the second virtual GPU 262.

The operational flow of the drug candidate discovery system 1, which includes the simulation execution module 20, the task provisioning module 22, the Docker container provisioning module 24, and the GPU 28, may be as follows. The task management module 201 may insert at least one of the first task 221 through the fifth task 225 for drug candidate discovery into the task queue 202 from the simulation workflow provided by the simulation setting module 14. In some embodiments, the task management module 201 may obtain "instantiated task modules" as items to be inserted into the task queue 202 from the task provisioning module 22 and insert them into the task queue 202. The status of a task inserted into the task queue 202 may be set to "waiting." Subsequently, the task management module 201 may delete a waiting task from the task queue 202 and request the GPU management module 203 to execute the task. The GPU management module 203 may allocate the requested task to the first virtual GPU 261 or the second virtual GPU 262 and execute it. The status of a task that has started execution may be changed to "running." The GPU management module 203 may block the virtual GPU assigned and running the task to prevent other tasks from being allocated to the same virtual GPU already in execution. It may also update information indicating available virtual GPUs.

Figure 10:
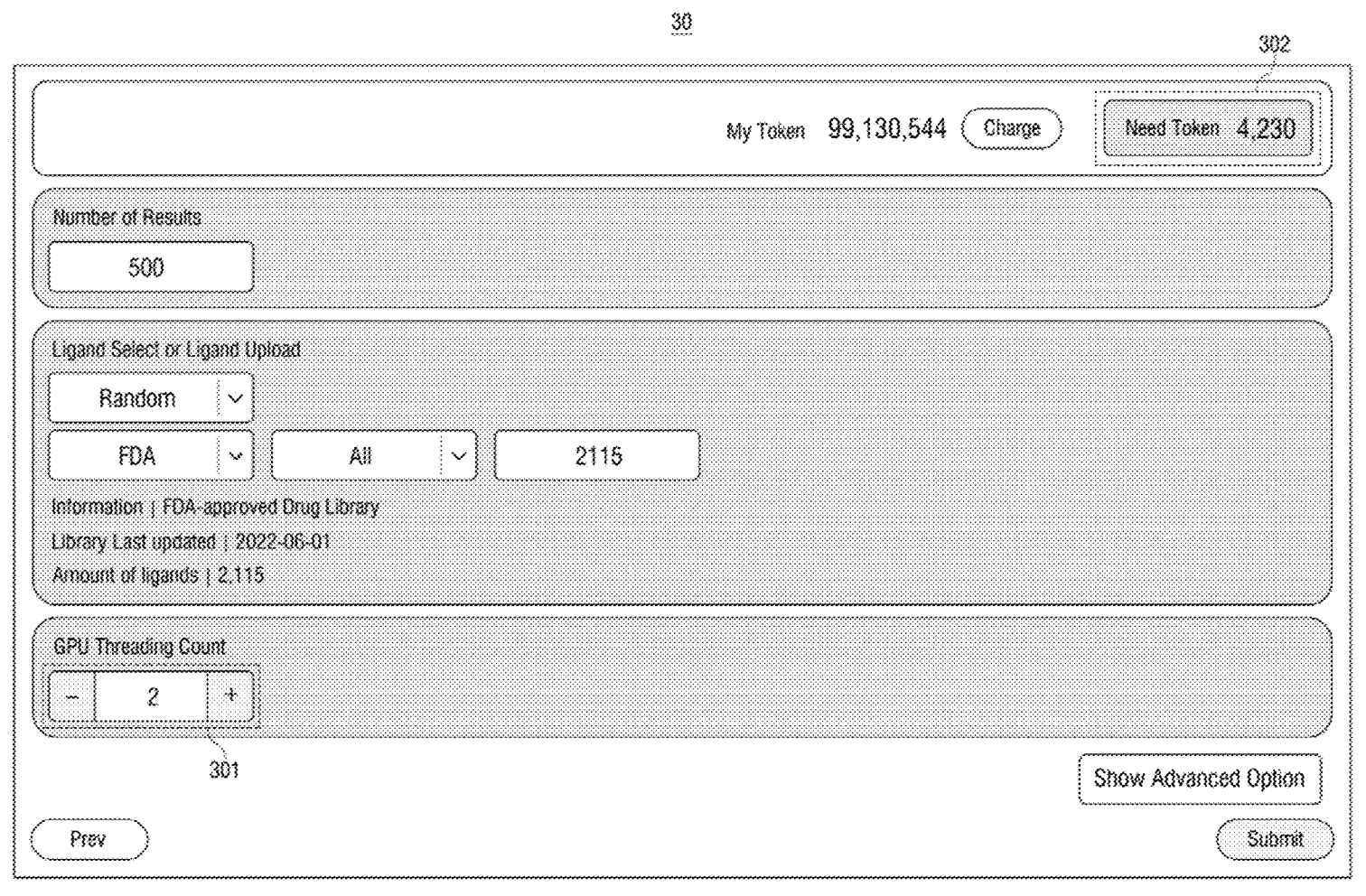

FIGS. 9 to 10 are diagrams illustrating an implementation example of a drug candidate discovery system according to an embodiment.

Referring to FIG. 9, a drug candidate discovery system 1 according to an embodiment may display a user interface 301 on a screen for receiving the number of GPUs to be used to execute simulation tasks for drug candidate discovery from a user. The user interface 301, labeled as "GPU Threading Count," may allow the user to set an integer value using a "+" button or a "−" button. In a MIG-based GPU environment, the value set through the user interface 301 may represent the number of threads corresponding to the units of data processed by the virtual GPU. For example, a single virtual GPU core may be implemented to process one or more threads.

Simultaneously, the drug candidate discovery system 1 according to an embodiment may display a user interface 302 on a screen, which calculates and displays the number of tokens required to execute simulation tasks for drug candidate discovery based on user input.

The drug candidate discovery system 1 may be implemented to deduct tokens from a user for detailed simulation tasks required for drug candidate discovery or recharge tokens when the user pays through coupons or various payment methods. Conventionally, there were no clear criteria established for the costs users must pay for detailed tasks involved in drug candidate discovery. Users were required to pay for the overall cost of drug candidate discovery rather than for each detailed task. However, since the workflow of detailed tasks for drug candidate discovery varies depending on the discovery purpose and environment, users sometimes incurred excessive costs regardless of the actual number and workload of the tasks performed. Furthermore, exceptional situations, such as the interruption of a task during execution, were often not reflected in the costs paid by the user.

The drug candidate discovery system 1 may determine the amount of tokens to be deducted for each detailed task involved in drug candidate discovery. Specifically, the token amount to be deducted may be determined by considering various factors related to the detailed task, such as the type of task, the workload of the task, and the complexity of the task. The token amounts may be stored in a storage medium or cloud accessible by a computing device in a form that can be read by the device. Users may utilize tokens based on established criteria for the detailed tasks they wish to perform. As previously described, users can generate a simulation workflow suitable for developing optimal compounds by configuring the connections between nodes with specific functions in drug candidate discovery. Users may pay tokens applied to each node according to varying rates and gain access to the respective node. Furthermore, users may pay only the necessary amount of tokens for the specific nodes they use.

In some embodiments, the amount of tokens to be deducted may be adjusted to decrease linearly or non-linearly depending on the progress of the detailed task. Specifically, if a certain amount of tokens is defined for a detailed task, the full amount of tokens may be deducted upon the completion of the task, while only a portion of the defined amount may be deducted if the task is partially completed. For example, tokens may be deducted only for the number of ligands specified by the user for analysis, or if the analysis is interrupted by the user or an error occurs, tokens may be deducted only for the amount of work completed up to that point. As a result, although drug candidate discovery generally requires significant costs, users can distribute costs by paying per detailed task. Furthermore, if a detailed task is not fully completed, users may only bear the cost corresponding to the partial completion of the task.

The user interface 302 may display the text "Need Token" along with the number of tokens required for the simulation task. In FIG. 9, the user has set a simulation task for 2,115 ligands, and since the user interface 301 is set to 1, the user interface 302 may indicate that 2,115 tokens are required for the simulation task, for example, in the case of the FDA-approved drug library, corresponding to the number of ligands. In this case, the task shown in FIG. 9 may be performed using a single thread.

Referring to FIG. 10, the value of the user interface 301 may be changed to 2. For example, a user may increase the value of the user interface 301 using the "+" button to obtain simulation task results more quickly. The user interface 302 may then display that 4,230 tokens are required for 2,115 ligands. In the case of FIG. 9, one thread is allocated to perform the simulation task for 2,115 ligands. However, in the case of FIG. 10, two threads are allocated to process the simulation task for the same 2,115 ligands, allowing the task completion time to be reduced by half.

As described above, users can directly determine the GPU usage for detailed tasks in drug candidate discovery and pay differentiated costs (token payments) based on the desired GPU usage. This approach allows users to avoid excessive services and costs while providing them the option to improve computation time and processing performance through GPU parallel processing. It also enables the implementation of a reasonable cost structure.

FIGS. 11 to 14 are diagrams illustrating an implementation example of a drug candidate discovery system according to an embodiment.

Referring to FIG. 11, a drug candidate discovery system 1 according to an embodiment may provide a list of virtual GPUs to a user (e.g., an administrator) on a screen 31. Specifically, the list may display a name identifying each virtual GPU, information on task modules available for the respective virtual GPU, and the maximum capacity supported by the virtual GPU. For example, the capacity may be displayed as the maximum RAM capacity in MB or as a value proportional to the RAM capacity.

For example, an item 311 in the list is displayed as "NVIDIA A100—No AIDock," and the "MAX CAPACITY" is shown as 40000. Here, the virtual GPU is identified by the name "NVIDIA A100," the task modules available for this virtual GPU include all task modules except the "AI-Dock" task module, and the maximum capacity supported by this virtual GPU is 40000. Next, an item 312 is displayed as "NVIDIA A100—AIDock only," and the "MAX CAPAC- ITY" is shown as 40000. Here, the virtual GPU is identified by the name "NVIDIA A100," the only task module available for this virtual GPU is the "AI-Dock" task module, and the maximum capacity supported by this virtual GPU is 40000. Finally, an item 313 is displayed as "NVIDIA A100," and the "MAX CAPACITY" is shown as 40000. Here, the virtual GPU is identified by the name "NVIDIA A100," there are no restrictions on the task modules available for this virtual GPU, and the maximum capacity supported by this virtual GPU is 40000.

When an item in the list displaying the name of a virtual GPU is clicked, the system navigates to a page where detailed information is provided, and the details can be modified.

Referring to FIG. 12, a detailed information page displayed when the item 311 is clicked is shown. Since the task modules available for "NVIDIA A100" include all task modules except the "AI-Dock" task module, the "Capacity" section lists the task modules as prep, admet, calici_fold, deep_calici, deep_calici_4dcnn, and deep_calici_resnet3d.

The task module "prep" represents the module for automatically identifying the optimal docking site in a target protein structure ("PocketFinder"). The memory capacity occupied by prep on the virtual GPU may be set to 10,000 MB. Accordingly, up to four prep modules can be executed simultaneously on "NVIDIA A100."

The task module "admet" represents the module for predicting absorption, distribution, metabolism, excretion, and toxicity based on the chemical structure of ligands ("ADME-Tox"). The admet module may use the CPU instead of the GPU. Accordingly, the memory capacity occupied by admet may be set to 0 MB. Although admet does not utilize the GPU, it must be included in the "Capacity" section with a capacity of 0 MB to ensure that it can be executed on the CPU.

The task module "calici_fold" represents the module for predicting the tertiary structure of a protein from an amino acid sequence ("CaliciFold"). This module may utilize the full memory capacity of the GPU. Accordingly, the memory capacity occupied by calici_fold on the virtual GPU may be set to 40,000 MB.

The task module "deep_calici" represents the module for converting kcal/mol into Kd/Ki (µM) for selected ligands and performing comparative analysis ("DeepCalici"). The memory capacity occupied by deep_calici on the virtual GPU may be set to 20,000 MB. Accordingly, up to two deep_calici modules can be executed simultaneously on "NVIDIA A100."

The task modules "deep_calici_4dcnn" and "deep_calici_resnet3d" represent modules for converting kcal/mol into Kd/Ki (µM) for selected ligands and performing comparative analysis based on a 4D CNN model and a ResNet 3D model, respectively. The memory capacity occupied by each of these modules on the virtual GPU may be set to 12,000 MB. Accordingly, up to three deep_calici_4dcnn modules can be executed simultaneously on "NVIDIA A100," or up to three deep_calici_resnet3d modules can be executed simultaneously.

Referring to FIG. 13, a detailed information page displayed when the item 312 is clicked is shown. Since the task modules available for "NVIDIA A100" include only the "AI-Dock" task module, the "Capacity" section lists only ai_dock as the task module.

The task module "ai_dock" represents the module for analyzing and sorting actual binding energy (kcal/mol) and providing the results to the user ("AI-Dock"). The memory capacity occupied by ai_dock on the virtual GPU may be set to 6,000 MB. Accordingly, up to six ai_dock modules can be executed simultaneously on "NVIDIA A100."

Furthermore, regarding FIG. 12, the previously described prep, admet, calici_fold, deep_calici, deep_calici_4dcnn, and deep_calici_resnet3d may not be included in the "Capacity" section.

Referring to FIG. 14, a detailed information page displayed when the item 313 is clicked is shown. Since there are no restrictions on the task modules available for "NVIDIA A100," the "Capacity" section includes all task modules: prep, admet, ai_dock, calici_fold, deep_calici, deep_calici_4dcnn, and deep_calici_resnet3d.

As described above, the system provides users with information on virtual GPUs available for drug candidate discovery, enabling users to set and modify the capacity for detailed tasks on a per-virtual GPU basis, considering the performance of each GPU. This allows for precise configuration of GPU resources. For example, if excessive capacity is allocated to a specific task module on a certain virtual GPU, considering the GPU's performance, the processing speed of the simulation task may slow down. In such cases, the user (administrator) can resolve this issue by allocating a smaller capacity to the task module (e.g., changing the capacity value for ai_dock from 8,000 to 6,000).

FIGS. 15 to 22 are diagrams illustrating an implementation example of a drug candidate discovery system according to an embodiment.

Referring to FIG. 15, a drug candidate discovery system 1 according to an embodiment may provide a list of Flask servers on a screen 32 to a user (e.g., an administrator). Here, a Flask server is a server powered by the Flask web framework, where task modules for drug candidate discovery may be stored in the form of Docker containers. Specifically, the detailed tasks for executing the simulation workflow, such as the first task 221 through the fifth task 225 described earlier in relation to the task provisioning module 22 in FIG. 8, may be stored in the Flask server in the form of Docker containers 241, 242, 243, and 244 provided by the Docker container provisioning module 24. It should be noted that the Flask server is merely one implementation example. The server storing the task modules for drug candidate discovery does not necessarily adopt the Flask framework and may be implemented using other frameworks. However, for clarity and convenience of explanation in this specification, the Flask server adopting the Flask web framework will be described as a representative but non-limiting example.

The list may display the following information about each Flask server: a name identifying the Flask server, information on the virtual GPUs used by the Flask server, port information used to access the Flask server, the total capacity supported by the Flask server, the remaining capacity currently available on the Flask server, and the usability status of the Flask server. Here, the total capacity supported by a Flask server may be calculated as the sum of the maximum capacities of all GPUs if the Flask server utilizes two or more virtual GPUs.

For example, an item 321 in the list is displayed with the Flask server name "cal-tb01." The "cal-tb01" server may utilize two "NVIDIA A100" GPUs, and the port number for accessing the "cal-tb01" server may be 9999. Additionally, the total capacity and the currently available capacity supported by the "cal-tb01" server are displayed as 80000 and 80000, respectively, and the server is marked as currently available.

When an item in the list displaying the name of a Flask server is clicked, the system navigates to a page where detailed information about the Flask server is provided and can be modified.

Referring to FIG. 16, a detailed information page displayed when the item 321 is clicked is shown. At the top, the page may display a user interface providing the IP address and port number for accessing the Flask server "cal-tb01," as well as the usability status of the Flask server "cal-tb01." This user interface may allow modifications to the IP address, port number, and usability status of the Flask server "cal-tb01." At the bottom, the page may display a user interface showing the GPU IDs used by the Flask server "cal-tb01," the types of the GPUs, the usability status of each GPU, and options for deleting each GPU. The user interface may also allow modifications to the GPU configuration for the Flask server "cal-tb01." In this example, the configuration indicates that the server uses two virtual GPUs: "NVIDIA A100" with GPU ID 0 and "NVIDIA A100" with GPU ID 1.

Referring to FIG. 17, a drug candidate discovery system 1 according to an embodiment may provide a list of GPUs used by a Flask server on a screen 33 to a user (e.g., an administrator). The list may display the name identifying the Flask server, the GPU ID information of the GPUs used by the Flask server, the types of GPUs used by the Flask server, the maximum capacity supported by each GPU, the currently available capacity of each GPU, and the usability status of each GPU. For example, the "cal-tb01" server uses two virtual GPUs: "NVIDIA A100" with GPU ID 0, a maximum capacity of 40000, and a currently available capacity of 40000; and "NVIDIA A100" with GPU ID 1, also with a maximum capacity of 40000 and a currently available capacity of 40000.

Referring to FIG. 18, a drug candidate discovery system 1 according to an embodiment may provide a list of tasks in the task queue 202 on a screen 34 to a user (e.g., an administrator). The list may display the position information of tasks inserted into the task queue 202, the URL information associated with each task, the release status of tasks in the task queue 202, the name of each task in the task queue 202, the ID of each task, and the number of threads used to execute each task.

For example, the task at position 0 in the task queue 202 has not yet been executed and is still in a waiting state, so it has not been released. The name of this task may be "PocketFinder," its ID may be "615," and the number of threads used to execute this task may be 1. The task at position 1 in the task queue 202 has also not yet been executed and is still in a waiting state, so it has not been released. The name of this task may be "Ai-Dock," its ID may be "617," and the number of threads used to execute this task may be 4. The task at position 2 in the task queue 202 has likewise not yet been executed and is still in a waiting state, so it has not been released. The name of this task may be "DeepCalici," its ID may be "618," and the number of threads used to execute this task may be 1.

Here, the execution order may be determined based on the position of tasks in the task queue 202. For example, the task at position 0 in the task queue 202 may first be evaluated for executability. If the task is determined to be executable, it may be executed. Once executed, the task at position 0 may be marked as released. If the task at position 0 is determined to be non-executable, its execution may be skipped. In this case, the task at position 0 may remain marked as not released.

Subsequently, the task at position 1 in the task queue 202 is evaluated for executability. If the task is determined to be executable, it may be executed. If the task at position 1 is determined to be non-executable, its execution may be skipped. Next, the task at position 2 in the task queue 202 is evaluated for executability. If the task is determined to be executable, it may be executed. If the task at position 2 is determined to be non-executable, its execution may be skipped.

Here, executability may be determined by comparing the capacity required by the task during execution with the currently available capacity on the GPU. For example, if the capacity required by the task does not exceed the currently available capacity on the GPU, the task may be determined to be executable. Conversely, if the capacity required by the task exceeds the currently available capacity on the GPU, the task may be determined to be non-executable. This determination can be implemented using such a comparison method.

For example, suppose a Flask server includes two virtual GPUs: the first virtual GPU has a currently available capacity of 2,000, and the second virtual GPU has a currently available capacity of 14,000. Additionally, assume that the task queue 202 contains tasks with IDs 615, 617, and 618, as exemplified in FIG. 18. The task with ID 615, named "PocketFinder," is at position 0 in the task queue 202. If the task is executed with one thread and each thread requires a capacity of 10,000, the total capacity required for execution would be 10,000. Next, the task with ID 617, named "Ai-Dock," is at position 1 in the task queue 202. If the task is executed with four threads and each thread requires a capacity of 6,000, the total capacity required for execution would be 24,000. Finally, the task with ID 618, named "DeepCalici," is at position 2 in the task queue 202. If the task is executed with one thread and each thread requires a capacity of 20,000, the total capacity required for execution would be 20,000.

In this case, only the task with ID 615 may be determined to be executable on the second virtual GPU. If the task with ID 615 is executed on the second virtual GPU, the currently available capacity of the second virtual GPU will decrease from 14,000 to 4,000. Since no tasks are executed on the first virtual GPU, its currently available capacity will remain at 2,000. Meanwhile, the tasks with IDs 617 and 618 will remain in the task queue 202 in a waiting state.

As another example, suppose the currently available capacity of the first virtual GPU is 40,000, and the currently available capacity of the second virtual GPU is also 40,000. Additionally, assume that the task queue 202 contains tasks with IDs 615, 617, and 618, as exemplified in FIG. 18. As reviewed earlier, the tasks with IDs 615, 617, and 618 may require capacities of 10,000, 24,000, and 20,000, respectively, for execution.

In this case, the task with ID 615 is determined to be executable on the first virtual GPU. Once executed, it occupies 10,000 of capacity, reducing the currently available capacity of the first virtual GPU to 30,000. Subsequently, the task with ID 617 is determined to be executable on the first virtual GPU. Once executed, it occupies 24,000 of capacity, further reducing the currently available capacity of the first virtual GPU to 6,000. Next, the task with ID 618 is determined to be non-executable on the first virtual GPU but executable on the second virtual GPU. Once executed, it occupies 20,000 of capacity, reducing the currently available capacity of the second virtual GPU to 20,000. As a result, the currently available capacity of the first virtual GPU becomes 6,000, and the currently available capacity of the second virtual GPU becomes 20,000. All tasks with IDs 615, 617, and 618 are marked as released, and the task queue 202 is emptied. FIG. 19 shows screen 34, which displays the list for the task queue 202 after all tasks with IDs 615, 617, and 618 have been executed.

Referring to FIG. 20, a drug candidate discovery system 1 according to an embodiment may provide a list on screen 35 to a user (e.g., an administrator) containing information about the blocked capacity (i.e., the capacity currently in use by tasks) during the execution of tasks scheduled in the task queue 202. The list may display the name of the Flask server where the tasks are being executed, the GPU ID of the GPU on which the tasks are being executed within the Flask server, the blocked capacity that is in use by running tasks and cannot be allocated to other tasks, the IDs of the running tasks, and the number of running tasks.

For example, on the "cal-tb01" server, when four threads of the task with ID "617" are executed, the blocked capacity on the virtual GPU with GPU ID 0 may be 24,000. Additionally, on the "cal-tb01" server, when one thread of the task with ID "615" is executed, the blocked capacity on the virtual GPU with GPU ID 0 may be 10,000. Furthermore, on the "cal-tb01" server, when one thread of the task with ID "618" is executed, the blocked capacity on the virtual GPU with GPU ID 1 may be 20,000. Once the execution of the tasks is completed, the blocked capacity may be released.

Referring to FIG. 21, during the execution of tasks, it can be confirmed on screen 33, previously described in relation to FIG. 17, that the currently available capacity of the virtual GPU with GPU ID 0 used by the Flask server has decreased from 40,000 to 6,000. Additionally, it can be confirmed that the currently available capacity of the virtual GPU with GPU ID 1 has decreased from 40,000 to 20,000.

Referring to FIG. 22, during the execution of tasks, it can be confirmed on screen 32, previously described in relation to FIG. 15, that the currently available capacity of the Flask server has decreased from 80,000 to 26,000.

FIG. 23 is a block diagram for explaining a computing device according to an embodiment.

Referring to FIG. 23, a drug candidate discovery system according to the embodiments may be implemented using a computing device 50.

The computing device 50 may include, via communication through a bus 509, at least one of the following: a processor 501, a memory 502, a storage device 503, a display device 504, a network interface device 505 providing access to a network 40 for communication with other entities, and an input/output interface device 506 providing user input or output interfaces. Of course, the computing device 50 may also include any additional electronic devices necessary to implement the technical ideas described in this specification, even if not shown in FIG. 23.

The processor 501 may be implemented as various types of devices, such as an application processor (AP), central processing unit (CPU), graphics processing unit (GPU), or neural processing unit (NPU). It may be any electronic device capable of executing programs or instructions stored in the memory 502 or the storage device 503. Specifically, the processor 501 may be configured to implement the functions or methods described earlier in relation to FIG. 1 through FIG. 22. For the drug candidate discovery system according to the embodiments of the present invention, AI-specialized computations may be processed on the GPU or NPU.

The memory 502 and the storage device 503 may include various types of volatile or non-volatile storage media. For example, the memory 502 may include ROM (read-only memory) or RAM (random access memory). The memory 502 may be located internally or externally to the processor 501 and may be connected to the processor 501 through various known means. Examples of the storage device 503 include HDDs (Hard Disk Drives) or SSDs (Solid State Drives), among others. The scope of the present invention is not limited to the elements listed above for illustrative purposes.

The drug candidate discovery system according to the embodiments may be implemented as programs or software executed on the computing device 50. Such programs or software may be stored on a computer-readable medium.

Meanwhile, the drug candidate discovery system according to the embodiments may be implemented using the hardware of the computing device 50 or as separate hardware that can be electrically connected to the computing device 50.

According to the embodiments described thus far, the system provides functions and a user interface optimized for drug candidate discovery. It improves upon the conventional issue where detailed tasks related to drug candidate discovery were provided through separate tools with low compatibility, making data sharing and consistent data management difficult. The system allows for easy management of simulation workflows by creating, modifying, and deleting nodes. Furthermore, it enables detailed and user-specific management of GPU resources required to execute the generated simulation workflows.

The embodiments of the present invention have been described in detail above, but the scope of the present invention is not limited to these descriptions. Various modifications and improvements that utilize the basic concepts of the present invention, as defined in the following claims, and that are made by those skilled in the art to which the present invention pertains, are also within the scope of the present invention.

The invention claimed is:

1. A drug candidate discovery system, comprising:
at least one computing device including at least one processor and at least one memory storing instructions that, when executed by the processor, cause the computing device to perform operations comprising:
creating a project for adding a task to perform drug candidate discovery;
creating a simulation desired by a user on the created project;
setting a simulation workflow for the simulation based on input from a user, using a canvas area and a simulation setting area comprising a protein structure data input area and a task module selection area, each comprising one or more objects that can be dragged and dropped onto the canvas area and converted into a node;
managing information on nodes that can precede or follow in the simulation workflow;
managing and executing a task for running the simulation workflow by dividing and allocating GPU resource of the computing device to the respective nodes; and
providing a plurality of tasks for performing drug candidate discovery, corresponding to elements of the simulation workflow set by dragging and dropping onto the canvas area by a user,
wherein:
the GPU resource comprises a virtual GPU,
the virtual GPU is assigned a first capacity representing the capacity supported by the virtual GPU, for each of the plurality of tasks, a second capacity representing the capacity required during task execution is assigned, for each of the plurality of tasks, the first capacity is compared with the second capacity to determine executability, and the second capacity is modified to a different value by the user.

2. The drug candidate discovery system of claim 1, wherein the operation of managing and executing the task comprises:

scheduling an execution of the task using a task queue; and managing GPU based on a multi-instance GPU using a Docker container and executing the scheduled task by utilizing a virtual GPU generated based on the GPU.

3. The drug candidate discovery system of claim 2, wherein the operation of providing the plurality of tasks comprises:

providing the task stored in the form of the Docker container to the operation of managing and executing the task.

4. The drug candidate discovery system of claim 3, wherein the operation of providing the plurality of tasks comprises:

allocating to the Docker container and providing to the operation of managing and executing the task: a first task for automatically identifying an optimal docking site in a target protein structure, a second task for predicting the tertiary structure of a protein from an amino acid sequence, a third task for analyzing and sorting an actual binding energy (kcal/mol) and providing the analyzed binding energy to a user, a fourth task for converting kcal/mol into Kd/Ki (µM) for selected ligands and performing comparative analysis, and a fifth task for predicting absorption, distribution, metabolism, excretion, and toxicity based on the chemical structure of ligands.

5. The drug candidate discovery system of claim 1, wherein the operations further comprise:

displaying on a screen:

a first user interface for receiving, from a user, the number of threads to be used to execute the task on the virtual GPU, and a second user interface for displaying, on the screen, the number of required tokens that a user must pay to execute the task, wherein the number of tokens increases or decreases based on the number of threads.

6. The drug candidate discovery system of claim 1, wherein the operations further comprise:

displaying a screen providing a list of the virtual GPU to the user, and wherein the list displayed on the screen includes: a name identifying the virtual GPU, information on a task module available for the virtual GPU, and a maximum capacity supported by the virtual GPU.

7. The drug candidate discovery system of claim 1, wherein the protein structure data input area comprises one or more objects related to a function of uploading protein structure data, and wherein the one or more objects can be dragged and dropped onto the canvas area and converted into: a first node configured to receive protein structure data in the form of a PDB (Protein Data Bank) file from a user, a second node configured to receive protein structure data in the form of a PDB code from a user, a third node configured to receive protein structure data in the form of a protein sequence file from a user, or a fourth node configured to receive protein structure data in the form of a protein sequence from a user.

8. The drug candidate discovery system of claim 7, wherein the task module selection area comprises one or more objects related to functions for performing detailed tasks in drug candidate discovery based on the uploaded protein structure data, and wherein the one or more objects can be dragged and dropped onto the canvas area and converted into: a fifth node configured to identify an optimal docking site in a target protein structure, a sixth node configured to predict the tertiary structure of a protein from an amino acid sequence, a seventh node configured to analyze and sort actual binding energy (kcal/mol) and provide the analyzed binding energy to a user, or an eighth node configured to convert kcal/mol into Kd/Ki (µM) for selected ligands and perform comparative analysis.

9. The drug candidate discovery system of claim 8, wherein nodes that can precede the fifth node comprise the first node, the second node, the third node, the fourth node, and the sixth node, and wherein nodes that can follow the fifth node comprise the seventh node.

10. The drug candidate discovery system of claim 8, wherein nodes that can precede the sixth node comprise the third node and the fourth node, and wherein nodes that can follow the sixth node comprise the fifth node.

11. The drug candidate discovery system of claim 8, wherein nodes that can precede the seventh node comprise the fifth node, and wherein nodes that can follow the seventh node comprise the eighth node.

12. The drug candidate discovery system of claim 1, wherein a node connection shape is displayed on the node placed in the canvas area, and while a user clicks on a node connection shape displayed on the right side of a certain node, the color or shape of a node connection shape displayed on the left side of other connectable node changes.

13. The drug candidate discovery system of claim 12, wherein the operation of managing information on nodes comprises:

managing information for determining whether connections between nodes are possible through metadata.

14. A drug candidate discovery system, comprising:

at least one computing device including at least one processor and at least one memory storing instructions that, when executed by the processor, cause the computing device to perform operations comprising:

creating a project for adding a task to perform drug candidate discovery;

creating a simulation desired by a user on the created project;

setting a simulation workflow for the simulation based on input from a user, using a canvas area and a simulation setting area comprising a protein structure data input area and a task module selection area, each comprising one or more objects that can be dragged and dropped onto the canvas area and converted into a node;

managing information on nodes that can precede or follow in the simulation workflow;

managing and executing a task for running the simulation workflow by dividing and allocating GPU resource of the computing device to the respective nodes; and displaying a first screen providing a list of a server to the user, wherein the list displayed on the first screen includes: a name identifying the server, information on a virtual GPU used by the server, port information used to access the server, a total capacity supported by the server, a remaining capacity currently available on the server, and a usability status of the server.

15. The drug candidate discovery system of claim 14, wherein the operations further comprise:

displaying a second screen providing a list of a virtual GPU used by the server to a user, and wherein the list on the second screen includes: a name identifying the server, GPU ID information of the virtual GPU used by the server, type information of the virtual GPU used by the server, a maximum capacity supported by the virtual GPU, a currently available capacity on the virtual GPU, and a usability status of the virtual GPU.

16. A drug candidate discovery system, comprising:

at least one computing device including at least one processor and at least one memory storing instructions that, when executed by the processor, cause the computing device to perform operations comprising:

creating a project for adding a task to perform drug candidate discovery;

creating a simulation desired by a user on the created project;

setting a simulation workflow for the simulation based on input from a user, using a canvas area and a simulation setting area comprising a protein structure data input area and a task module selection area, each comprising one or more objects that can be dragged and dropped onto the canvas area and converted into a node;

managing information on nodes that can precede or follow in the simulation workflow; and managing and executing a task for running the simulation workflow by dividing and allocating GPU resource of the computing device to the respective nodes; and displaying a first screen providing a list of a task queue to a user, wherein the list on the first screen includes: position information of a task inserted into the task queue, URL information associated with the task, information on whether the task inserted into the task queue are released, a name of the task inserted into the task queue, an ID of the task, and the number of threads used to execute the task.

17. The drug candidate discovery system of claim 16, wherein the operations further comprise:

determining whether the task inserted into the task queue is executable, and executing the task if the task is determined to be executable, wherein executability of the task is determined by comparing a capacity required for executing the task with a currently available capacity on the virtual GPU, and the task is determined to be executable if the capacity required for executing the task does not exceed the currently available capacity on the virtual GPU, and not executable if the capacity required for executing the task exceeds the currently available capacity on the virtual GPU.

18. The drug candidate discovery system of claim 16, wherein the operations further comprise:

displaying a second screen providing a list to a user, the list including information on a blocked capacity during the execution of the task that was scheduled in the task queue.

* * * * *